(12) United States Patent  (10) Patent No.: US 8,631,595 B2
McDonald  (45) Date of Patent: Jan. 21, 2014

(54) EXCAVATING APPARATUS WITH SWIVEL MOUNT EMPLOYING SWIVEL ADAPTER WITH GEAR BEARINGS HAVING GEARS WITH DIVERGENT THICKNESS

(76) Inventor: Jason Wayne McDonald, High Point, NC (US)

( * ) Notice: Subject to any disclaimer, the term of this patent is extended or adjusted under 35 U.S.C. 154(b) by 0 days.

(21) Appl. No.: 13/530,324

(22) Filed: Jun. 22, 2012

(65) Prior Publication Data

US 2013/0101341 A1   Apr. 25, 2013

Related U.S. Application Data

(60) Provisional application No. 61/571,168, filed on Jun. 22, 2011.

(51) Int. Cl.
*E02F 3/65* (2006.01)

(52) U.S. Cl.
USPC .............................................. 37/417; 37/466

(58) Field of Classification Search
USPC ............ 37/403–411, 466, 417, 394; 180/395, 180/347, 41, 235, 24.01, 311, 781, 785; 414/695, 698, 699, 700, 626, 738–741; 296/190.04, 190.05; 403/150, 151, 403/157, 158, 288
See application file for complete search history.

(56) References Cited

U.S. PATENT DOCUMENTS

| 3,700,126 | A | * | 10/1972 | Beaton ........................ 414/718 |
| 4,349,230 | A | * | 9/1982 | Hamburger et al. ............ 299/33 |
| 5,486,084 | A | * | 1/1996 | Pitman et al. ................. 414/694 |
| 7,735,248 | B2 | * | 6/2010 | Sakada et al. ................... 37/466 |
| 7,735,530 | B1 | * | 6/2010 | Riha et al. ..................... 144/4.1 |
| 8,177,017 | B2 | * | 5/2012 | Asam et al. ................... 180/311 |

* cited by examiner

*Primary Examiner* — Robert Pezzuto
(74) *Attorney, Agent, or Firm* — Robert W. Pitts

(57) ABSTRACT

A swivel adapter mount can be mounted on the end of a boom of excavating equipment, such as a crawler excavator or on a backhoe. Rotation of the swivel adapter mount will impart rotation to an implement, such as bucket, mounted on the boom. This rotation is not possible with a conventional wrist joint on the boom of an excavator or backhoe. With the bucket swiveled using this swivel adapter mount, a slope may be defined on the sides of a ditch, by only using the backhoe or excavator. The implement can be swiveled or tilted about transverse axes as will as being manipulated by a conventional wrist joint. Gear bearings having gear teeth of divergent thickness are employed on the swivel adapter.

5 Claims, 21 Drawing Sheets

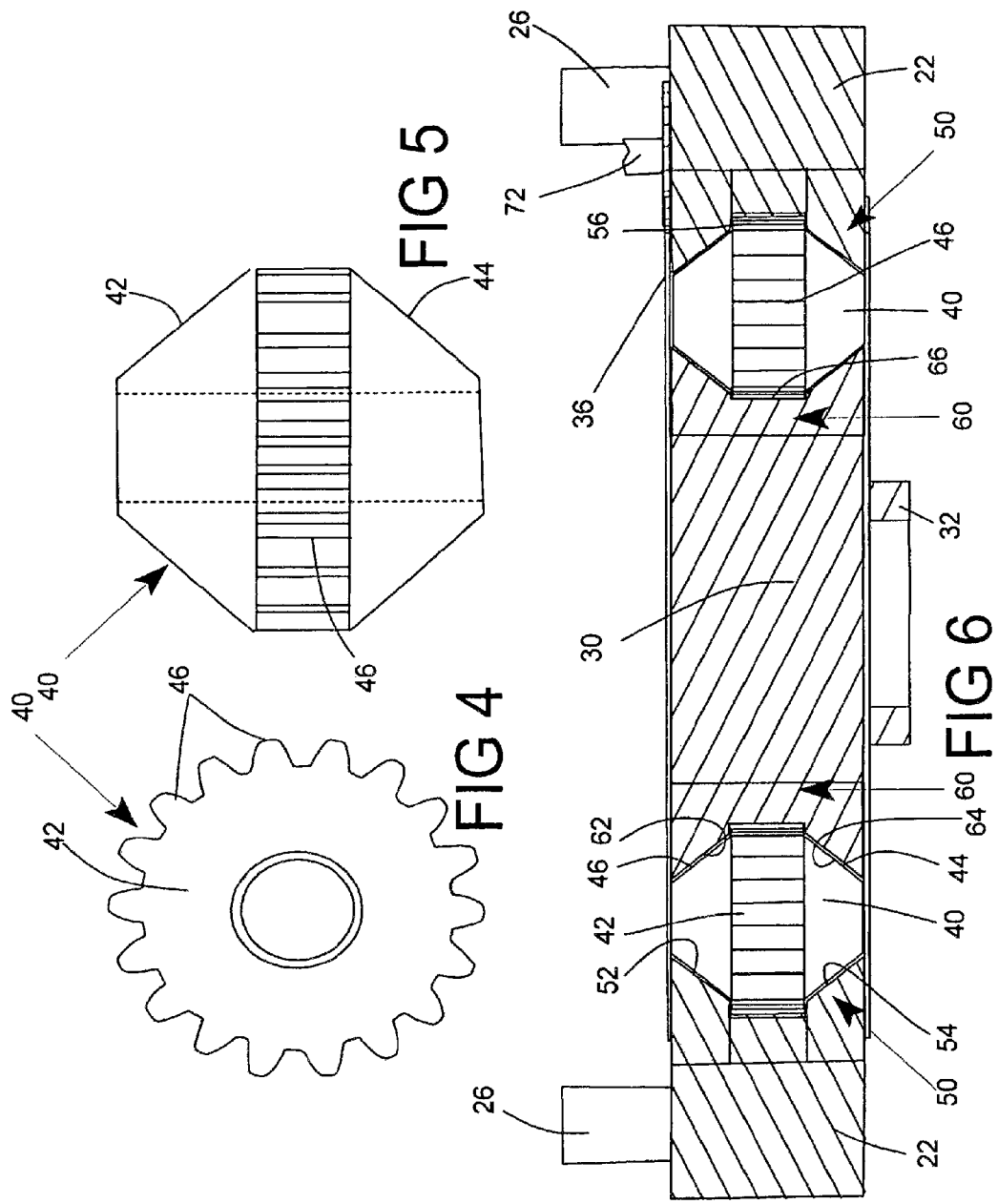

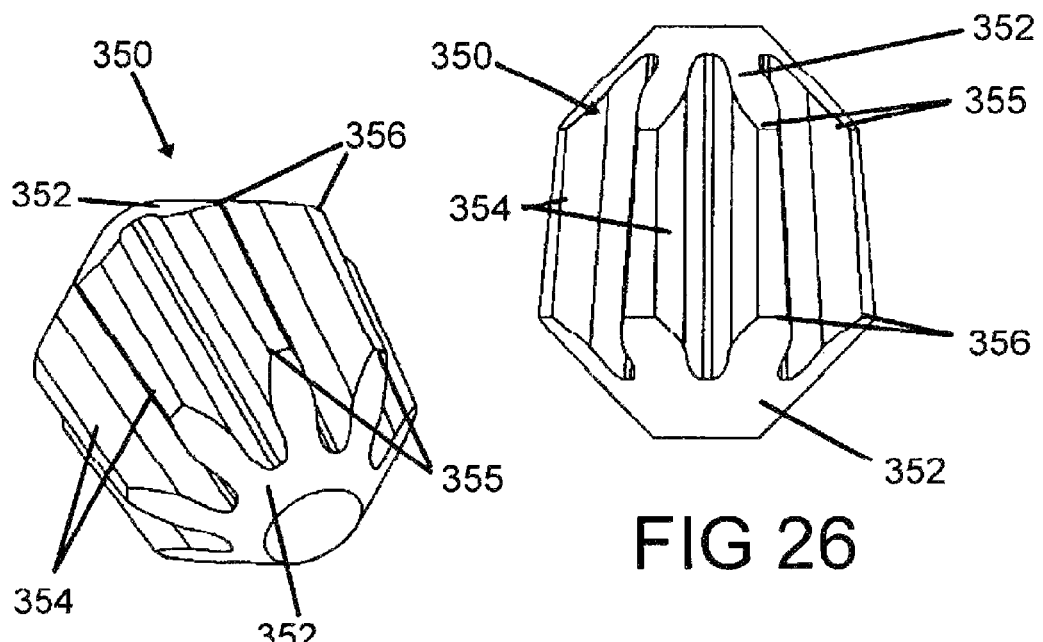
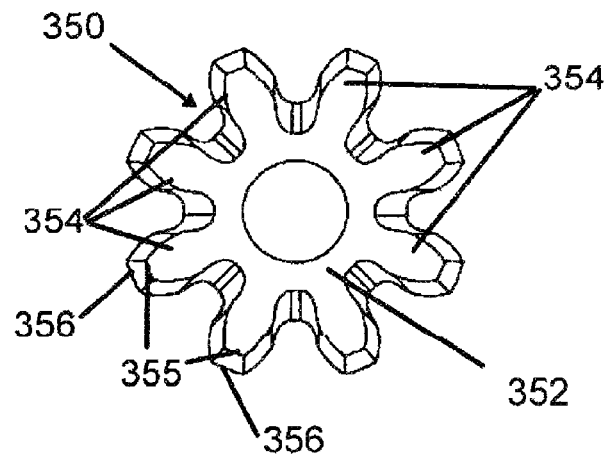
FIG 25
FIG 26
FIG 27

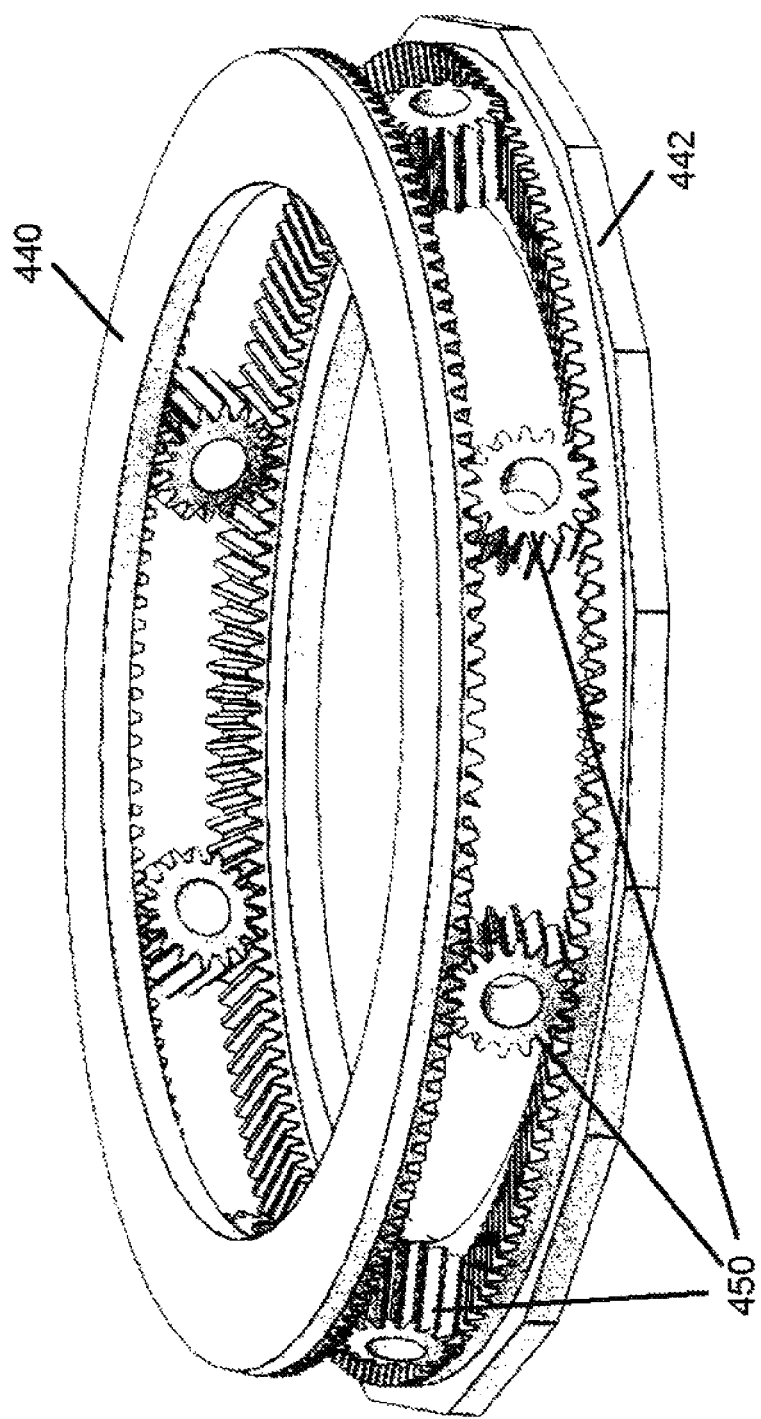

EXCAVATING APPARATUS WITH SWIVEL MOUNT EMPLOYING SWIVEL ADAPTER WITH GEAR BEARINGS HAVING GEARS WITH DIVERGENT THICKNESS

CROSS REFERENCE TO PRIOR CO-PENDING APPLICATIONS

This application claims the benefit of previously filed, U.S. Provisional Patent Application 61/571,168 filed Jun. 22, 2011.

BACKGROUND OF THE INVENTION

1. Field of the Invention

This invention relates to a swivel adapter mount that can be used with excavating equipment, such as a backhoe or excavator. A bucket of other implement can then be moved to positions that would not be possible with a conventional backhoe or similar device. This invention is also related to bearing assemblies that will operate in such an environment with a relatively long service life.

2. Description of the Prior Art

Conventional backhoes and crawler type excavators are not suited for digging ditches with sloping sides. These types of conventional excavating equipment do not have the ability to tilt or swivel a bucket or claw so that a slope can be graded. Therefore a separate piece of equipment, such as a device with a telescoping boom and tilted claw, such as the type manufactured by Gradall are typically employed.

The instant invention provides a swivel adapter mount that allows a bucket to be tilted so that a slope can be graded by using a backhoe, a crawler type excavator or similar piece of equipment.

There have been earlier devices that are intended to tilt or swivel an excavating bucket for use in grading a slope. However, these devices have not proven to be effective. In some cases they require a large number of component parts and are therefore costly both to manufacture and to repair. The more parts that are necessary than the chance then the greater the chance of a break down if other things are equal. Others have not proven to be sturdy enough for use in the field.

Most of these prior art devices employ hydraulic means to rotate a bucket through and angle of approximately forty-five degrees. If these devices could rotate through three hundred sixty degrees or be capable of continuous rotation, they could be employed with implements other than buckets and could greatly expand the versatility of backhoes, crawler excavators or similar commonly available equipment.

Mechanisms to tilt or swivel a bucket on the end of an excavating boom have been discussed in U.S. Pat. No. 5,515,626; U.S. Pat. No. 5,561,926; U.S. Pat. No. 6,146,082; U.S. Pat. No. 6,539,650; and in International Published Patent Application WO 2007/097698. However, none of these approaches is believed to be as versatile and reliable as the swivel adapter mount of the instant invention.

SUMMARY OF THE INVENTION

According to one aspect of this invention, a gear bearing assembly to be used between two rotating members includes first and second raceways. Each includes raceway gears and raceway bearing surfaces and a plurality of gear bearings between the first and second raceways. The gear bearings include gears extending around the gear bearings and at least one bearing surface. Individual gear teeth on the gears have a thickness at one end that is greater than the thickness at an opposite end.

According to another aspect of this invention, a swivel adapter mount for swiveling an earth moving implement relative to a boom, is tiltable relative to the boom about a tilt axis transverse to a swivel axis. The swivel adapter includes a mounting member attachable to the boom. A rotatable member is attachable to the earth moving implement and rotates about the swivel axis extending through a central section of the rotatable member. The rotatable member is driven to rotate relative to the mounting member to swivel the earth moving implement transverse to the tilt axis and relative to the boom when the swivel adapter mount is attached thereto. A plurality of gear bearings are located between the mounting member and the rotatable member and extend around the rotatable member and are spaced from the swivel axis. Each gear bearing engages raceways on the mounting member and the rotatable member. Each gear bearing has gears extending around the gear bearings and at least one bearing surface. Individual gear teeth on the gears have a thickness at one end that is greater than the thickness at an opposite end.

BRIEF DESCRIPTION OF THE DRAWINGS

FIG. 4 is a top view of one of the gear bearings.

FIG. 5 is a side view of one of the gear bearings.

FIG. 6 is a view of the rotary gear bearing assembly including inner and outer raceways and gear bearings positioned between the inner and outer plates.

FIG. 25 is a three dimensional view of an alternate embodiment of a gear bearing having gears with diverging thickness for use on a swivel adapter.

FIG. 26 is a side view of the gear bearing of FIG. 25 showing the increase in the thickness of each gear between opposite ends of the gear bearing.

FIG. 27 is an end view of the bearing shown in FIGS. 25 and 26.

FIG. 34 is a view of the position of gear bearings relative to raceway ring gears for the various embodiments depicted herein. Raceway load bearing members are not shown in FIG. 34 for purposes of illustration.

DETAILED DESCRIPTION OF THE PREFERRED EMBODIMENTS

Figure 1:
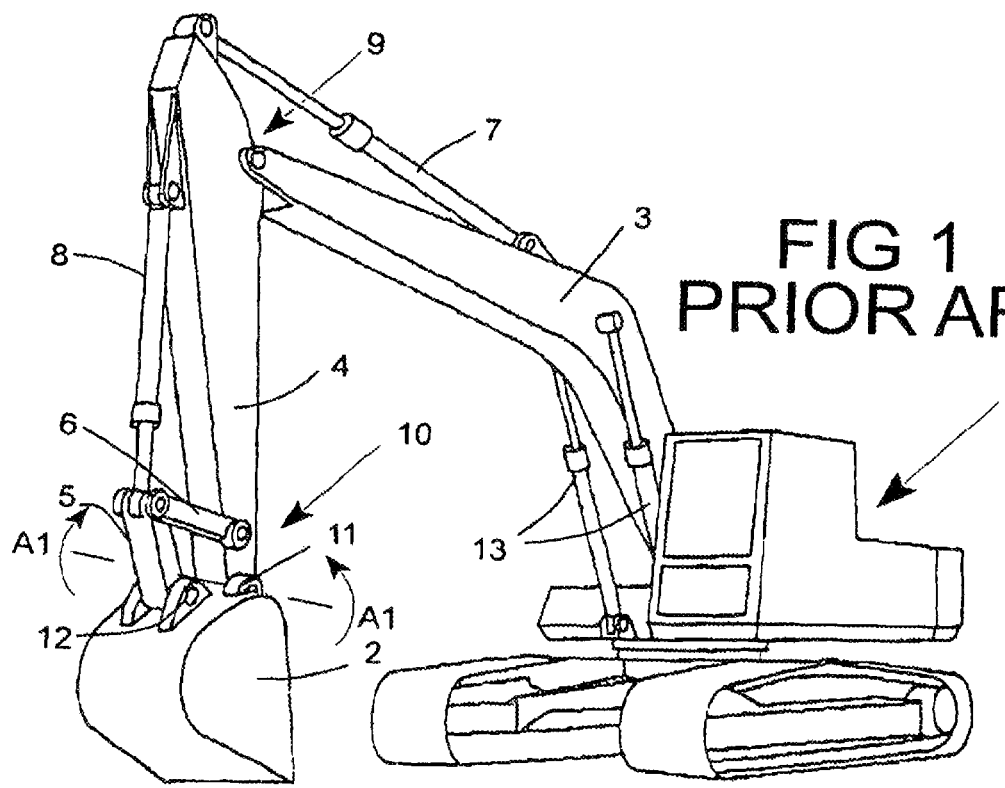
FIG. 1 is a view of a prior art crawler type excavator employing a bucket. The apparatus according to this invention can be used with this and other types of conventional excavating equipment.

FIGS. 1-24 show the evolution of gear bearing assemblies of the type that can be used with heavy duty equipment, such as earth moving excavators of the type shown in FIG. 1. FIGS. 25-33 show the preferred embodiment of a gear bearing assembly incorporating gear bearings with divergent gears, that is the subject of the instant invention.

FIG. 1 is a view of a prior art excavator 1 with which the swivel adapter mount or swivel mounting adapter according to this invention can be used to mount implements such as an excavating bucket or claw 2. FIG. 1 shows a crawler type excavator but it should be understood that this excavator is merely representative of other types of excavating equipment. In particular, the swivel adapter or swivel adapter mount of this invention can be used on a backhoe. With the use of suitable brackets, swivel mounting adapters of this invention can be used on various types of excavating equipment, without modifying the swivel adapter itself.

The prior art crawler type excavator 1, shown in FIG. 1 employs a boom 3 and an articulated main arm 4. A hydraulic arm cylinder 7 and a hydraulic bucket cylinder 8 can be employed to rotate the main arm 4 relative to the boom 3 about an elbow joint 9. Hydraulic cylinders 13 can raise and lower the boom 3. The main arm 4 is attached to the bucket 2 by a wrist joint 10 through a forward bucket pivot 11, so that the bucket 2 can be rotated relative to the arm 4. In order to impart this rotation, an auxiliary arm 5 is also connected to the bucket 2 through a rear bucket pivot 12, and the auxiliary arm 5 is connected to the main arm 4 by a link 6. Reciprocation of a piston in hydraulic cylinder 8 will cause the bucket 2 to rotate about an axis A1-A1, shown in FIG. 1, substantially perpendicular to the main arm 4, though an angle of approximately one hundred eighty degrees, so that the bucket 2 can be used for excavating in a conventional manner. Articulation of the bucket 2 and the main arm 4 is essentially confined to motions parallel to the plane through the centerline of the boom 3, and in a standard excavating apparatus such as the crawler excavator 2, the bucket 2 cannot be swiveled or twisted relative to the main arm 4 or the boom 3. For a crawler excavator 2, the entire apparatus can be turned relative to the crawler tracks, but this movement is normally intended to deposit dirt of other debris to another location after excavation. A backhoe does not normally permit the boom assembly to be turned in this manner.

Figure 2:
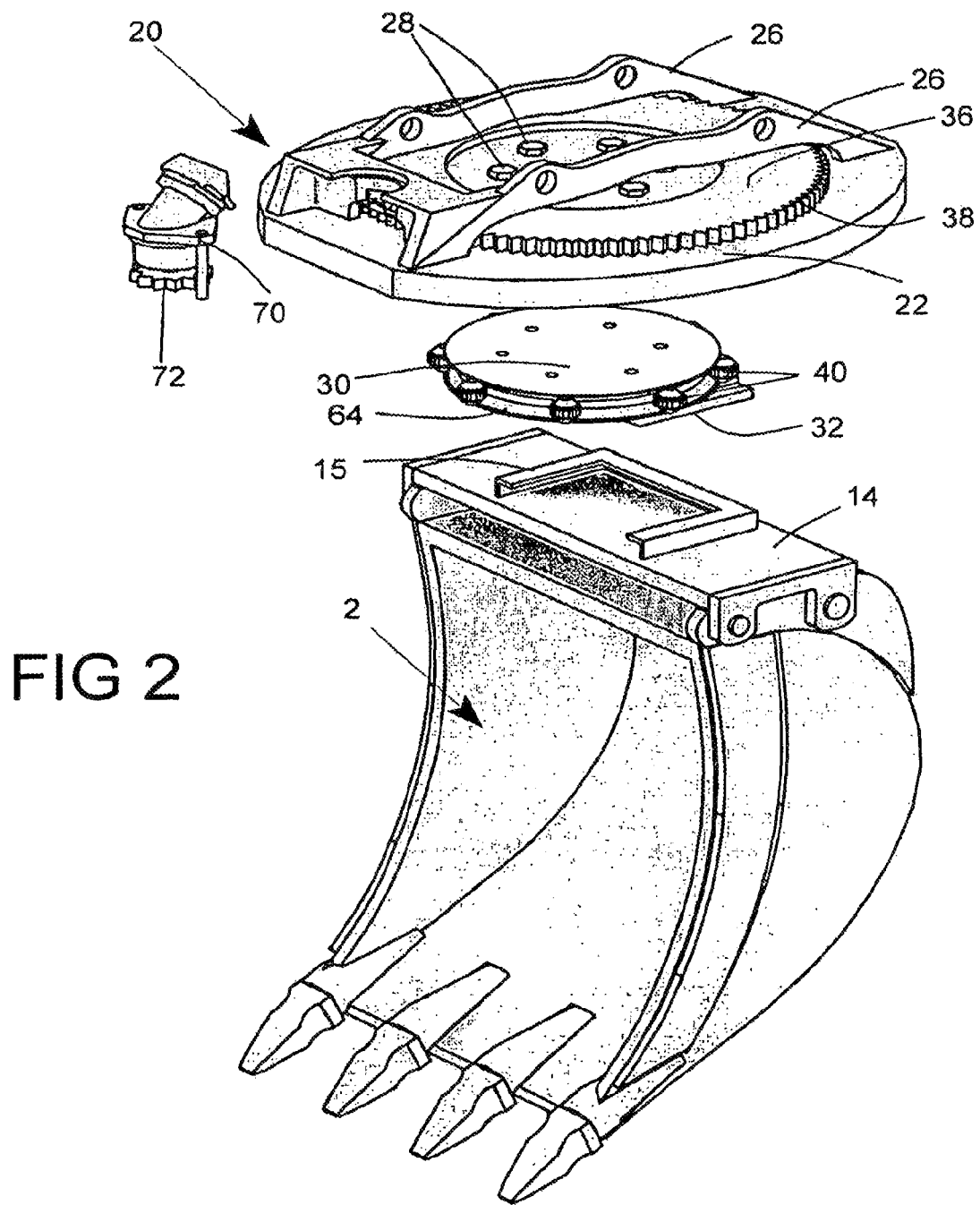
FIG. 2 is an exploded three dimensional view, viewed slightly from above, showing components of a swivel mount and a bucket that it will mount to otherwise conventional excavating equipment.
Figure 3:
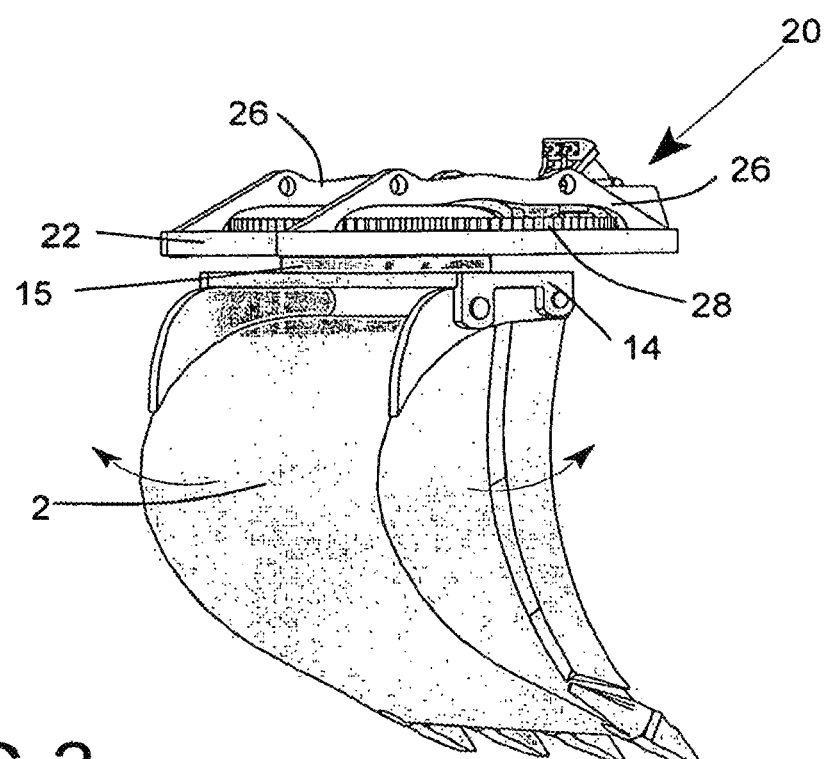
FIG. 3 is an elevational view, partially form the rear, of the swivel mount with a bucket attached thereto.

The instant invention provides a mounting adapter assembly that will allow a bucket or other implement to be swiveled or twisted relative to the main arm 4 of standard excavating equipment or mechanism, such as backhoes and crawler excavators, without requiring modification to the main arm assembly 4 or to the boom 3, other than perhaps mounting additional hydraulic transmission lines or electric wires or transmission lines to power the swiveling adapter. Only minor modifications need be made to standard implements or other mechanisms, such as buckets. FIG. 2 shows the manner in which a standard bucket 2, of the type shown in FIG. 1, can be modified for use with the swiveling adapter of this invention, simply by the addition of a bracket 14 to the bucket 2. The bracket 14 is attached to the bucket 2 by two pins 18 and 19 extending through the pivots 11 and 12 on a conventional bucket 2. The bracket 14 includes a connector 15, which in this embodiment is generally U-shaped with two side rails 16 and 17, which will overlap and retain a corresponding bracket on the swiveling adapter 20 in a manner that will be subsequently discussed in more detail. Once this bracket 14 is attached to the bucket 2, this subassembly can be attached to and removed from a swivel adapter mount 20 according to this invention. The bracket 14 can remain attached to the bucket 2, and brackets 14 can be permanently mounted on other implements that can also be mounted on excavating equipment by using this swivel adapter mount 20. Of course one bracket 14 can be used interchangeably with other implements, especially when changeovers are expected to be infrequent. It should be understood that the bracket 14 is merely representative of a number of different types of brackets that could be used in accordance with this invention. The same swiveling adapters or swivel adapter mounts 20 and implements, such as buckets 2, can be used on different types of excavating equipment, with only the possible requirement is some cases, that adapter brackets designed to fit specific equipment, may need to be interchanged.

The swivel adapter mount 20 includes an outer mounting plate 22 and an inner rotatable plate 30, that is received within a central opening 24 formed in the outer plate 22. In the embodiment shown in FIGS. 3-8, the inner plate 30 rotates relative to the relatively stationary outer plate 22 about a vertical axis, and the bucket 2 attached thereto, will also rotate about the vertical axis, a movement that is not possible with a conventional wrist joint 10 on conventional excavators or backhoes. In alternative embodiments, the outer plate 22 can rotate relative to a relatively stationary inner plate 30, if the inner plate 30 is attached to the wrist joint 10. The swivel adapter mount 20 and the bucket 2 can rotate through an angle of at least three hundred sixty degrees so that the bucket 2 can assume any angular orientation relative to the wrist joint 10 and arm 4 to which it may be attached. The swivel adapter mount 20 can also continuously turn in either direction so that the bucket 2 or other implement attached to the swivel adapter mount 20 can also continuously turn through any number of revolutions. Although continuous revolution may be unnecessary for a bucket 2, other implements, such as augers or routers, can be mounted by the swivel adapter mount 20, and continuous revolution through angles greater than three hundred sixty degrees would be required.

The outer plate 22 includes two couplers 26 adjacent opposite sides thereof. These couplers 26 allow the swivel adapter mount 20 to be attached to the wrist joint 10 in substantially the same manner as a conventional bucket 2 is attached directly to a wrist joint 10. The circular inner plate 30 includes a plate connector 32 attached to its lower face. This plate connector 32 can be attached to a bracket connector 15 or a bracket 14 that has been secured to an implement such as bucket 2. This connection will attach the bucket 2 or other implement to the inner plate 30 so that rotation of inner plate 30 relative to outer plate 22 will impart rotation to the bucket 2 or other implement.

A rotary actuator 70 is mounted on the outer plate 22, and includes a drive gear 62. This rotary actuator 70 can be a hydraulically powered actuator or an electrically powered actuator. Lines 74, which can be hydraulic or electric lines will be mounted on the boom 3 and arm 4 of excavating equipment so that the rotary actuator 70 can be controlled from the cab by the equipment operator. A peripheral lip 36 is mounted to the inner plate 30 by fasteners or bolts 28 so that the lip 36 and the inner plate 30 are secured to each other an move in unison. A driven gear 38 extends around the peripheral lip 36 and is engaged by the drive gear 72 so that rotation of the drive gear 72 imparts rotation to the inner plate 30 on which the bucket 2 or other implement is mounted. Since the outer plate 22 is rigidly attached to the main arm 4 of the excavating equipment 1 by couplers 26, rotation of inner plate 30, relative to outer plate 22, imparts rotation of the bucket 2 or other implement relative to the main arm 4 about axis A2-A2, a motion that is not possible with conventional wrist joints 10. It should be understood that a gear box could be added between the rotary actuator 70 and the driven gear 38. A gear box could be used to limit the loads that would be placed on the rotary actuator 70, especially where a hydraulic actuator is employed. A gear box could also provide additional resistance to loads applied in an opposite direction from which the rotary actuator 70 is trying to rotate the inner plate 30. The peripheral lip 38 overlaps the portion of the outer plate 22 around the periphery of the central opening 24. The significance of this overlap will be subsequently discussed in greater detail with reference to lubrication of a rotary bearing assembly between the outer plate 22 and the inner plate 30.

Figure 9:
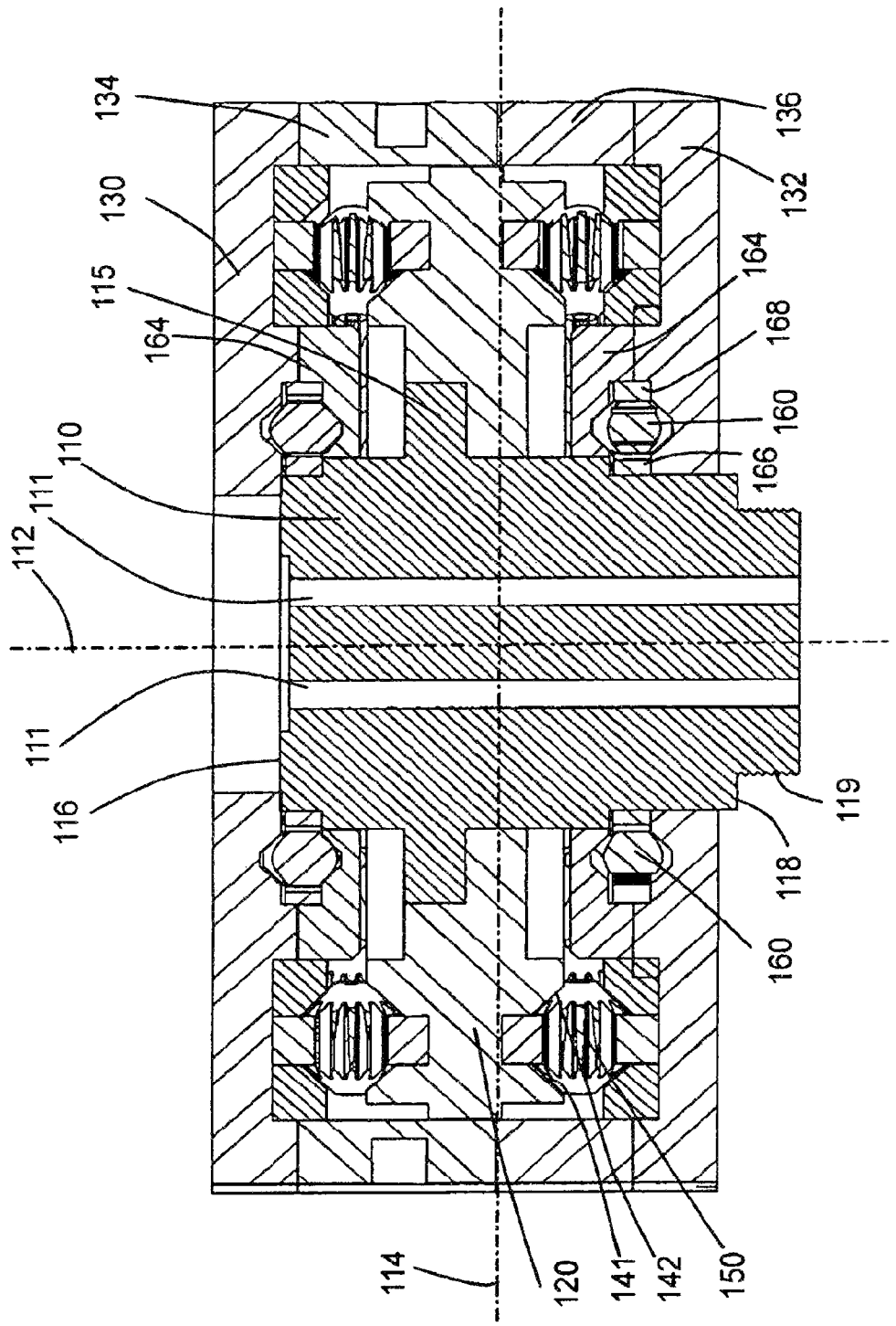
FIG. 9 is a cross section view of the swivel mechanism of the second embodiment showing a heavy duty gear bearing assembly included in the swivel mechanism.
Figure 10:
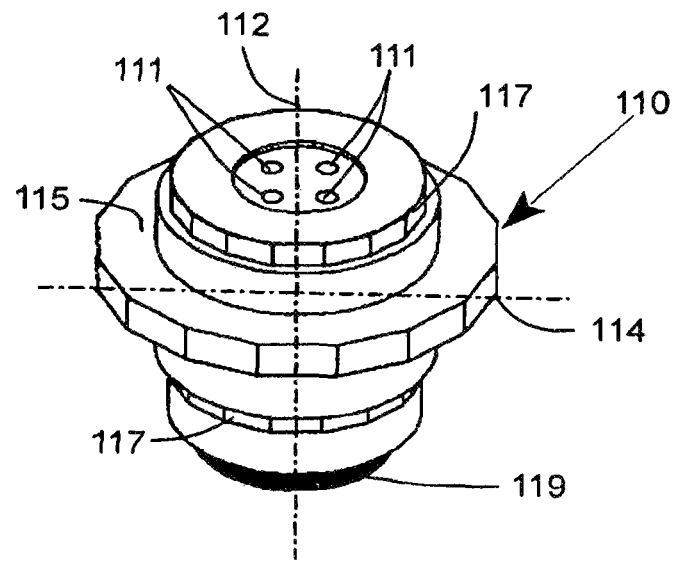
FIG. 10 is a view of a shaft or central member extending through the center of the swivel mechanism of FIG. 9 showing passages through which hydraulic lines can extend.

Although the outer plate 22 is stationary relative to rotating inner plate 30, this outer plate 22 can rotate about axis A1-A1, shown in FIG. 1, by conventional rotation of the wrist joint 10, when the swivel adapter mount 20 is positioned on an excavator arm as shown in FIG. 9. Rotation of the outer plate 22 about axis A1-A1 through wrist joint 10, while the inner plate remains stationary relative to outer plate 22, will impart the same rotation of the bucket 2 attached to the swivel adapter mount 20 as would occur if the bucket 20 were attached directly to the wrist joint 10. The depth of the swivel adapter mount 20 is relatively small, because the inner plate 30 fits within the outer plate 22. These plates are also oriented parallel to the back face of the bucket 2. Therefore, the swivel mount adapter 20 will not add any significant length to the boom assembly, and the presence of the swivel mount adapter 20 will not significantly affect normal operation of the wrist joint 10. However, the swivel mount adapter 20, when combined with the wrist joint 10 will permit the bucket 10, or any other implement, to be oriented in any conceivable direction that is possible by any combination of rotation about both axes A1-A1 and the vertical axis. Since the swivel adapter mount 10 is attached to the ends of the main arm 4, and auxiliary arm 5, with the plates 22 and 30 transverse to the main arm 4, the swivel adapter mount 20 will not restrict movement of the bucket 2 relative to the main arm 4 or the degree of motion of the wrist joint 10.

Any operation that would be possible with a normal bucket mount would be possible when the swivel adapter mount 20 is attached between the main arm 4 and the bucket 20. However, other operations will possible. One particular operation that would be possible is to grade sloping sides of a ditch, an operation that is not possible with a standard backhoe or excavator. Rotation of the bucket 2 by movement of the wrist joint 10 will permit excavation of a ditch as the bucket 2 is rotated and moved toward the operator by movement of the boom 3 and the articulated arm 4. When digging a ditch in this manner the boom 3 and main arm 4 would be parallel to a vertical plane along which the ditch is being dug. Side edges of the ditch would remain perpendicular due to the shape of a conventional bucket 2. The swivel adapter mount 20 will, however, allow the bucket 2 to be rotated relative to this plane so that the bottom edge of the bucket 2 will be at an angle relative to the vertical plane extending though the ditch. Thus as the bucket 2, angled due to rotation of the inner plate 30, is moved toward the operator, the bottom edge of the bucket 20 will grade a slope extending from the ditch to the surface. The swivel adapter mount 20 allows rotation of the bucket in each direction, and both sides of the ditch can be graded to form a suitable slope. Since the operation can continuously rotate the bucket 2, by application of a force through the actuator 20, which can be controlled by the operator, a constant slope can be maintained even as the boom 3 and the main arm 4 are moved to move the bucket 2 toward the operator's position, straddling the eventual extent of the ditch.

FIGS. 4-6 shows details of the gear bearing assembly that comprises the one embodiment of the bearings used with this invention. FIGS. 4 and 5 show a single gear bearing 40. FIG. 4 is a top view and FIG. 5 is a side view. Each gear bearing 40 includes an upper conical bearing surface 42 and a lower conical bearing surface 44. These conical surfaces face in generally perpendicular directions and the inclination of these gear bearing surfaces 42 and 44 will bear both lateral loads and transverse loads. Stud gears or gear teeth 46 encircle the gear bearings 40 and in this embodiment these gears 46 are disposed between the oppositely facing conical bearing surfaces 42 and 44. A number of gear bearings 40 are disposed between the inner plate 30 and the outer plate 22.

FIG. 6 shows the a first of the bearing assembly that would employ gear bearings 40 as it would be positioned between the inner plate 30 and the outer plate 22. FIG. 6 is not intended to be to scale, nor are the components shown therein necessarily to scale, so that the individual components can be shown with greater clarity. An outer bearing raceway 50 is either formed on or attached to the outer plate edge forming the central opening 24. In the outer raceway 50 would be attached to the outer plate 22, and the outer raceway 50 would be formed as separate pieces, both for more efficient fabrication and for easier assembly of the gear bearing subassembly. Outer raceway 50 would extend completely around the central opening 24 of outer plate 22. Outer raceway 50 has an upper tapered or conical bearing surface 52 and a lower tapered or conical bearing surface 54. Bearing surfaces 52 and 54 will about conical bearing surfaces 42 and 44 on the gear bearings 40 and a line contact will be maintained because the gear bearings will rotate relative their own axis and will progress or revolve around the outer raceway 50 as the inner plate 30 rotates relative to the outer plate 22. Outer raceway gears 56 will engage bearing gears 46 so that the gear bearings 40 will walk around the outer raceway 50.

An inner raceway 60 is also formed around the edge of the inner plate 30. Again the inner raceway 60 may be formed on the edge of the inner plate 30 or it may be attached thereto as either a single component or as a multi-piece subassembly, depending upon manufacturing considerations. Inner raceway also has an upper tapered or conical bearing surface 62 and a lower tapered or conical bearing surface 64, which will bear against the gear bearing surfaces 42 and 42 in opposition to corresponding bearing surfaces on the outer raceway 50. The inner raceway gear teeth 66, between bearing surfaces 62 and 64 will engage bearing gears 46, so that rotation of the inner plate 30 will impart rotation to the gear bearings 40. As the inner plate 30 turns, the gear bearings 40 will then turn and will walk around inner plate 22 and inner plate raceway 60. The angular spacing between multiple gear bearings 40 will however be constant because of the engagement of the gears. A rotary gear bearing assembly of this type is shown in US Published Patent Application 2009/0097794, which is incorporated herein by reference. This gear bearing assembly incorporated herein will allow the swivel adapter mount 20 to rotate a bucket 2 or other implement, even when subjected to relatively large operational loads applied either parallel, transverse or perpendicular to the plane of the plates 22 and 30. It should be understood that other bearing subassemblies that could withstand such operational loads could also be employed in this swivel adapter mount 20.

In addition to showing the gear bearing assembly, FIG. 6 also shows a version of this invention in which the upper peripheral lip 36 joined to the inner plate 30 is used with a lower peripheral lip 37. Both peripheral lips 36 and 37 extend from the inner plate 30 and overlap a portion of the outer plate 22. A small gap between the peripheral lips 36 and 38, and adjacent faces of the outer plate 22 will be small enough so that a grease or other suitable lubricant will remain trapped around the gear bearings 40. Once injected, this grease will remain in the cavity bounded by the peripheral lips 36 and 27 and will not only lubricate the bearings 40 but also prevent dirt, dust and other debris from penetrating this cavity. Of course, the peripheral lips 36 and 37 may not be needed, if sufficiently close tolerances can be maintained above and below these bearings, but the peripheral lips 36 and 37 do provide a simple means for trapping grease or other suitable lubricants.

Figure 7:
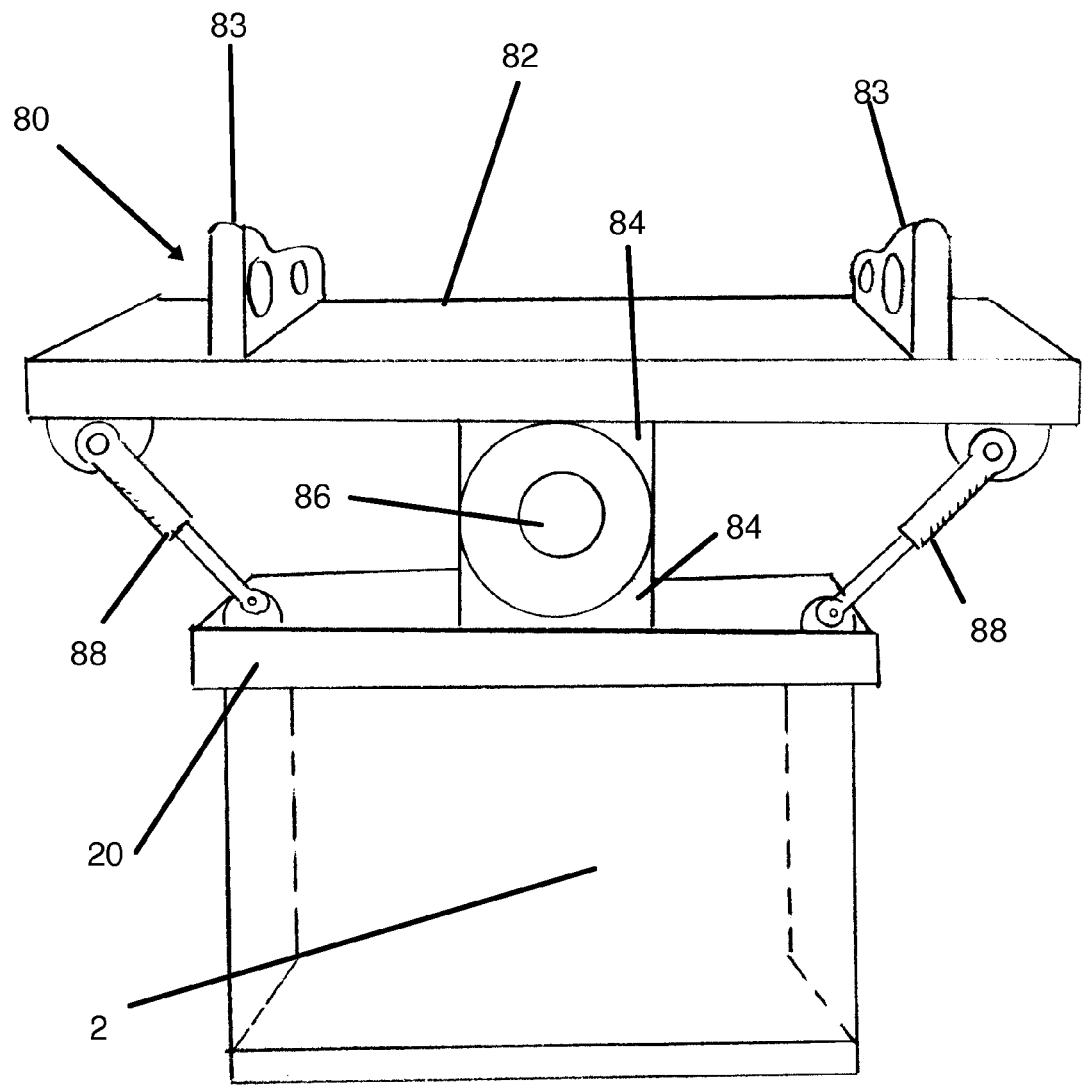
FIG. 7 is a view of an alternate configuration showing the use of hydraulic tilt pistons in conjunction with a swivel adapter mount.
Figure 8:
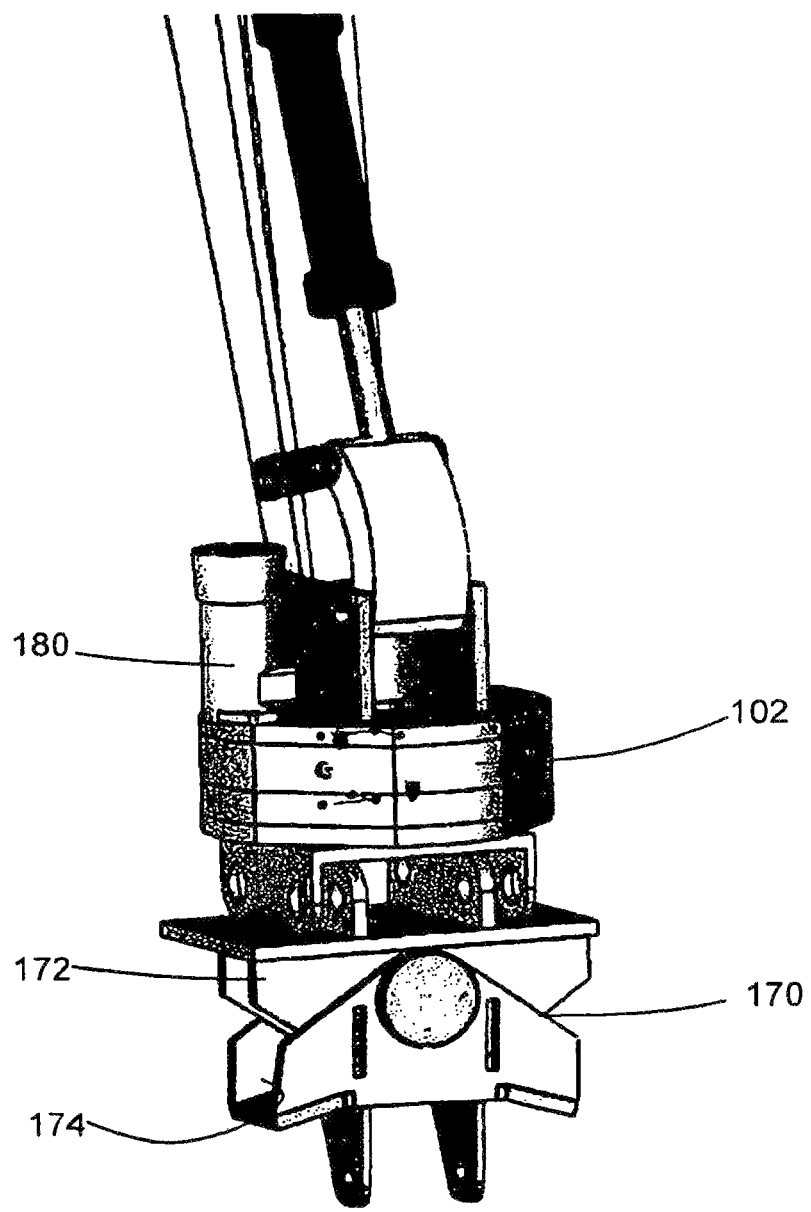
FIG. 8 is a view of a second embodiment of a swivel and tilt mechanism that can be mounted on a boom of a conventional excavator.

Although the swivel adapter mount 20 should provide sufficient degrees of freedom or range of motion for most applications of this device, the swivel adapter mount can be used with other mechanisms to increase the range of motion. FIG. 7 is one example of the use of a swivel adapter mount 20 with a bucket 2, and with an additional tilt mechanism 80. The swivel adapter mount 20 is attached to the bucket 2 in the same manner as previously discussed. However, the tilt mechanism 80 would attach the swivel adapter mount 20 to the wrist joint of an excavator or backhoe arm. This tilt mechanism comprises an auxiliary mounting plate 82 that would be attached to the wrist joint by conventional couplers 83. Two U-shaped yokes 84 would attach the swivel adapter mount 20 to the auxiliary mounting plate 82. One yoke extends from the auxiliary mounting plate and the other would extend from the outer plate 22 on the swivel adapter mount 20. A pin 86 extending through the yokes 84 would secure the swivel adapter mount 20 to the auxiliary mounting plate 82. Two hydraulic pistons 88 extending between the auxiliary mounting plate 82 and the inner plate 22, would impart rotation to the swivel adapter mount 20 relative to auxiliary mounting plate 82 because the yokes 84 can rotate relative to each other about the axis formed by the pin 86. The auxiliary tilt mechanism 80 could tilt the bucket 2.

This auxiliary tilt mechanism 80 is useful in certain situations encountered with the use of excavating equipment. For instance, in some situations excavating equipment must be positioned on an inclined slope and not on level ground. For example, it may not be possible to position the excavating equipment on a paved street when digging a ditch, because any damage to the pavement must be reimbursed by the operator. Often the width of the space to which the piece of excavating equipment must be confined is limited by contract or by regulation. This can require an operator to build up a level surface on which he can position the piece of excavating equipment. However, the tilt mechanism 80 will permit the operator to operate an implement, such as a bucket, as if the implement were level, even though the piece of excavating equipment is sitting at an angle relative to the horizontal.

It would be possible to grade some inclined slopes by only manipulating the auxiliary tilt mechanism 80 without relying upon the swivel mechanism 20. Of course the swivel mechanism 20 can be used to grade an inclined slope without reliance upon the tilt mechanism 80, and since the swivel adapter mount mechanism 20 can rotate through a much wider angle than the auxiliary tilt mechanism, the swivel adapter mount mechanism 20 will be the more effective tool. However, coordinated use of both the swivel mechanism 20 and the auxiliary tilt mechanism 80 will increase the range of motion to enhance the efficiency of the excavating equipment. For example, if the boom 3 and main arm 4 are retracted so that the bucket 2 is a close to the cab as possible, it may not be possible, rotating only the swivel adapter mount mechanism 20, to continue grading the slope for the full range of motion of the boom 3 and main arm 4. However, combined rotation of the swivel adapter mount mechanism 20 and the auxiliary tilt mechanism 80 will allow the operator to continue grading the inclined slope for the full range of motion for the boom 3 and the main arm 4, which means fewer strokes will be required for a given job. Grading is possible from full extension to complete retraction of the bucket 2. Furthermore combined use of the swivel mechanism 20 and the tilt mechanism will make it much easier to grade on the diagonal as the boom 3 and main arm 4 retract the bucket toward the cab and operator, even though that movement may not be parallel to the direction of a ditch on which the slopes are graded. Slopes with gradients of 1:1 to 1:4 can be easily graded using this invention and especially using this combination of swivel and tilt. Furthermore, the combination of the two mechanisms can simplify other jobs, such as grading valleys that are needed for drainage at many sites. Irregular shapes and surfaces for swimming pools can be easily formed using this invention. This apparatus can also simplify digging sewer lines.

A second embodiment of swivel apparatus or mount 102 is shown in FIGS. 8-22. Swivel mount or adapter 102 is also suitable for use on a conventional excavator, as shown in FIG. 1. The swivel mount adapter 102 would be mounted on a wrist joint 10 at the end of a main arm 4 on an articulated boom. A boom attachment connects the swivel mount mechanism 102 to the wrist joint 10 so that manipulation of the wrist joint 10 in a conventional manner will raise and lower the swivel mount 102, and any other implements attached thereto through an implement attachment 119. In other words, manipulation of the wrist joint 10 by hydraulic pressure in a conventional manner will operate a bucket 2 in the same way that a bucket 2 through the same range of motion if the bucket 2 were attached to a wrist joint 10 on a prior art excavator or backhoe, so that no operative capabilities will be lost by positioning the swivel mount 102 between the wrist joint 10 and the bucket 2.

Not only can the swivel mechanism 102 be used with a conventional implement, such as a bucket 2, but other hardware or mechanisms can also employed with both the swivel 102 and the bucket 2. FIGS. 101 and 102 show the swivel mechanism 102 employed with a tilt mechanism 170, which will tilt the bucket 2 about an axis generally perpendicular to the axis of rotation of the wrist joint 10, no matter what the angular orientation to which the swivel mechanism 102 has positioned the bucket 2.

The second embodiment of the swivel mount 102 is especially suited for applications in which the loads applied to the swivel mount 102 through either the articulated boom mechanism or thought the implement, such as bucket 2 are relatively large, and the components of the swivel mount 102 must be sturdy enough to bear those loads. The swivel mount 102 also can be rotated through at least three hundred sixty degrees without becoming entangled with transmission lines, such as hydraulic lines that may be needed to activate implements, equipment or mechanisms attached to the swivel mount 102. Provision is thus made to allow transmission through the center of the swivel mount 102.

As shown in FIG. 9, swivel mount 102 includes a shaft or central 110 passing through the center of three annular plates or members that are positioned, one of top of the other. The shaft 110 includes a sufficient number of passages 111 for transmission of hydraulic fluid or electrical cables. In the embodiment depicted herein, multiple passages are dimensioned to allow hydraulic fluid to be transmitted through those passages. Conventional hydraulic lines or hoses can be attached to the top shaft end 116 and to the shaft bottom end 118. Conventional hydraulic couplings, not show, can be employed. The swivel mount will rotate through angles of at least 360 degrees about shaft axis 112, and since the passages 111 are parallel to shaft axis 112, hydraulic lines or other transmission lines attached to the shaft 110 will not become entangled. The entire swivel mount 102 along with any implements attached thereto can be rotated about axis 114 extending transversely to shaft axis 112 by conventional manipulation of the wrist joint 10.

The shaft 110 can be rotated relative to a top mounting member, comprising a top annular plate 130 and a bottom annular plate or member 132, which is parallel to the top annular plate 130. An intermediate annular member or disk 120 is positioned between the top annular mounting member 130 and the bottom annular plate 132. The intermediate disk 120 is attached to the exterior of the shaft 110, and the intermediate disk 120 will rotate together with the shaft 110 relative to the annular plates 130 and 132. Both the top mounting member 130 and the bottom plate having central openings though which the shaft 110 will extend, but the intermediate disk 120 remains sandwiched between plates 130 and 132.

In addition to the three plates or members 120, 130 and 132, two rims 134 and 136 are stacked between the top and bottom annular plates 130 and 132, and surround the intermediate annular plate, member or disk 120. The stack including the top annular plate 130, the top rim 134, the bottom rim 136 and the bottom annular plate 132 are bolted together, with the shaft 110 extending through central openings in the top and bottom annular plates 130 and 132. The top and bottom rims 134 and 136 each have a larger central opening to provide room for the disk 120 as well as radially projecting portions of the shaft 110.

Figure 11:
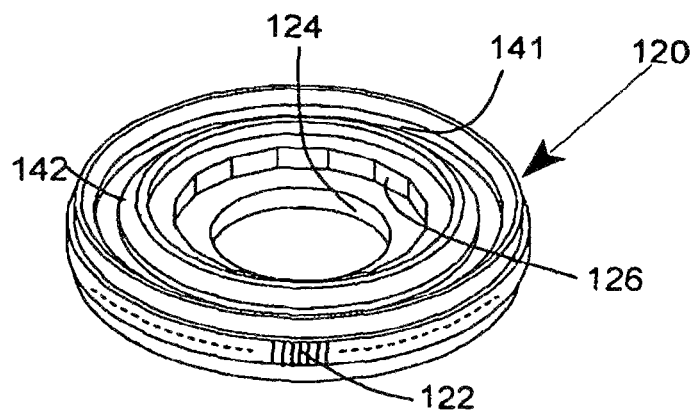
FIG. 11 is a view of an annular disk with a driven gear that extends around the periphery of the disk.
Figure 12A:
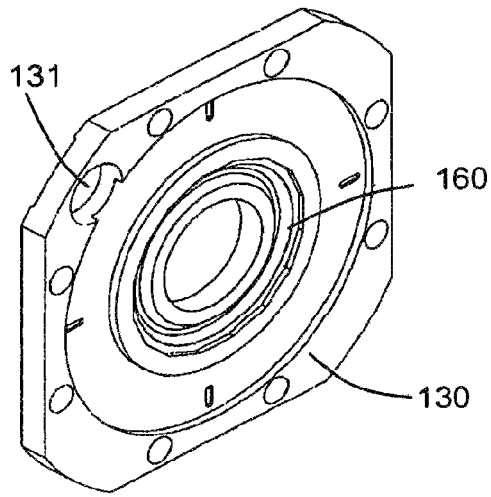
FIGS. 12A and 12B are views respectively of a top annular plate and a top center plate in the swivel mechanism of FIG. 9.
Figure 13A:
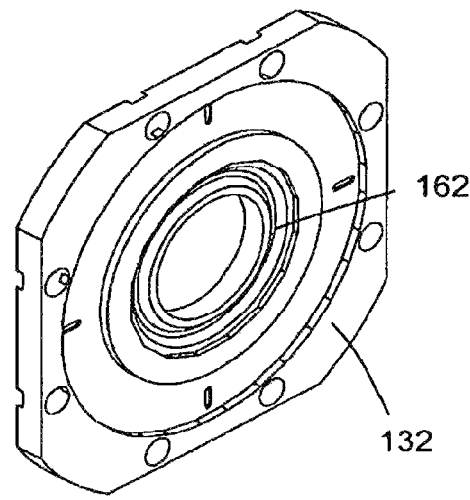
FIGS. 13A and 13B are views respectively of a bottom annular plate and a bottom center plate in the swivel mechanism of FIG. 9.
Figure 12B:
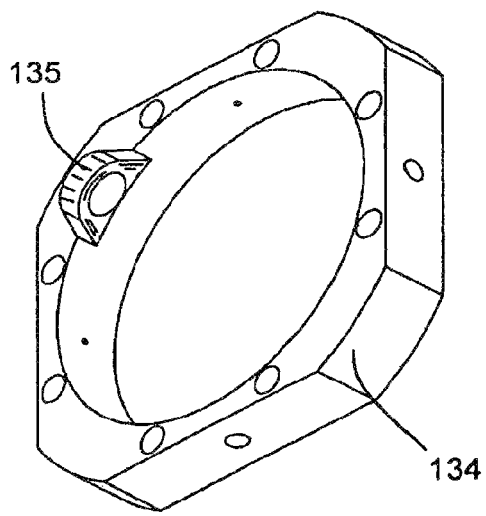
Figure 13B:
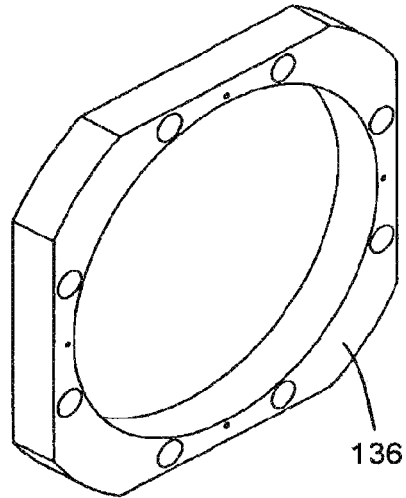
Figure 14A:
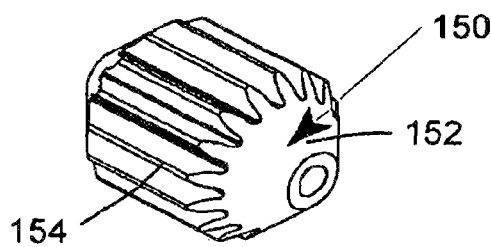
FIGS. 14A and 14B are views of one of the individual gear bearings employed in the swivel mechanism of FIG. 9.
Figure 14B:
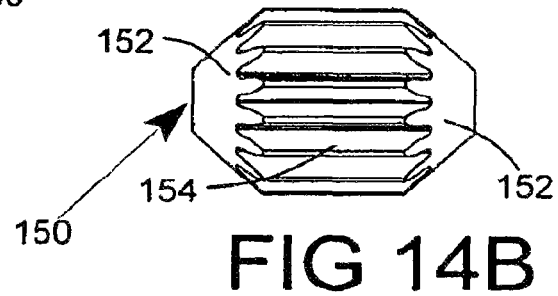
Figure 15A:
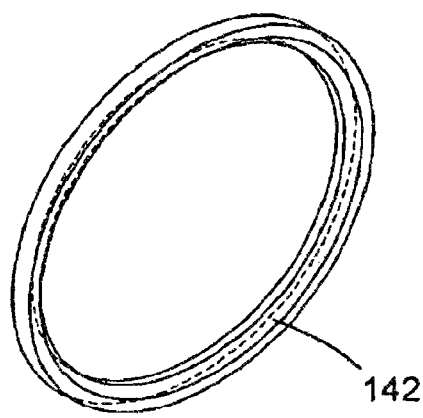
FIGS. 15A and 15B are views respectively of an outer raceway and an inner raceway that are engaged by bearing surfaces on the gear bearings shown in FIGS. 14A and 14B.
Figure 15B:
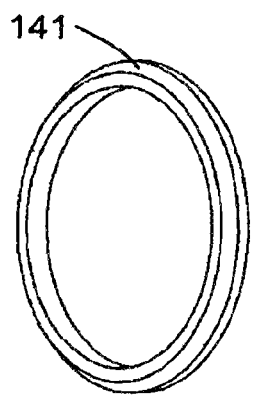
Figures 16A, 16B:
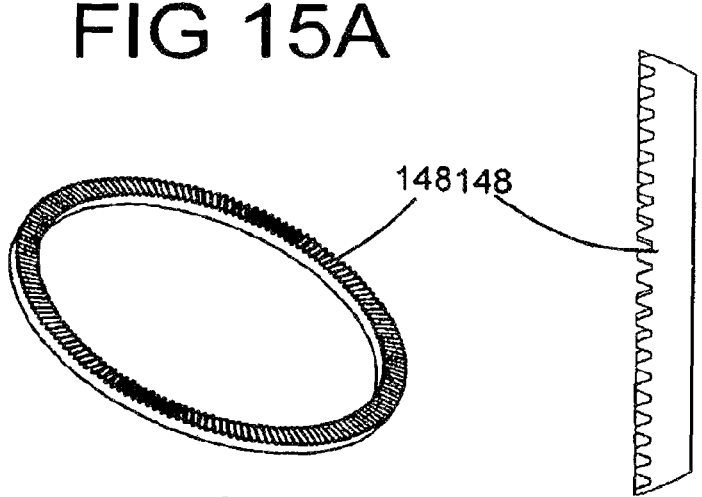
FIGS. 16A and 16B are view of raceway gears that engage the gear portions of the gear bearings shown in FIGS. 14A and 14B.
Figure 17:
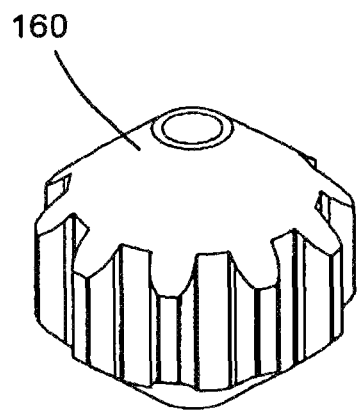
FIG. 17 is a view of one of a supplemental gear bearing employed in the embodiment of FIG. 9.
Figure 18:
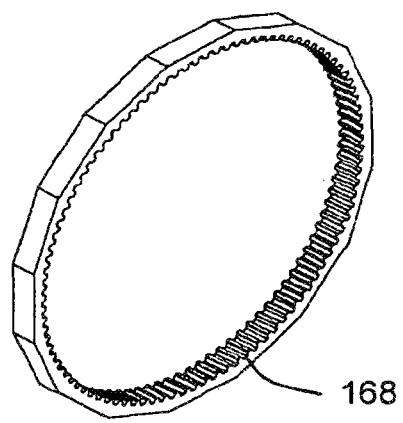
FIG. 18 is a view of a supplemental outer raceway gear employed in the embodiment of FIG. 9.
Figure 19:
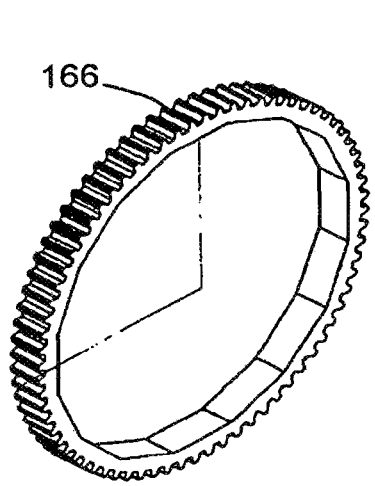
FIG. 19 is a view of a supplemental inner raceway gear employed in the embodiment of FIG. 9.
Figure 20:
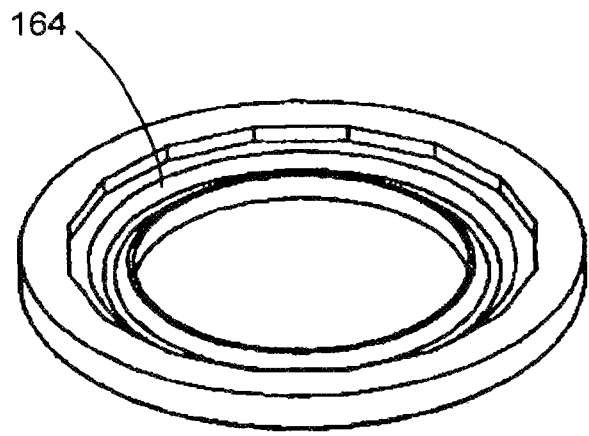
FIG. 20 is a view of a supplemental lower tapered raceway and support plate employed in the embodiment of FIG. 9.
Figure 21:
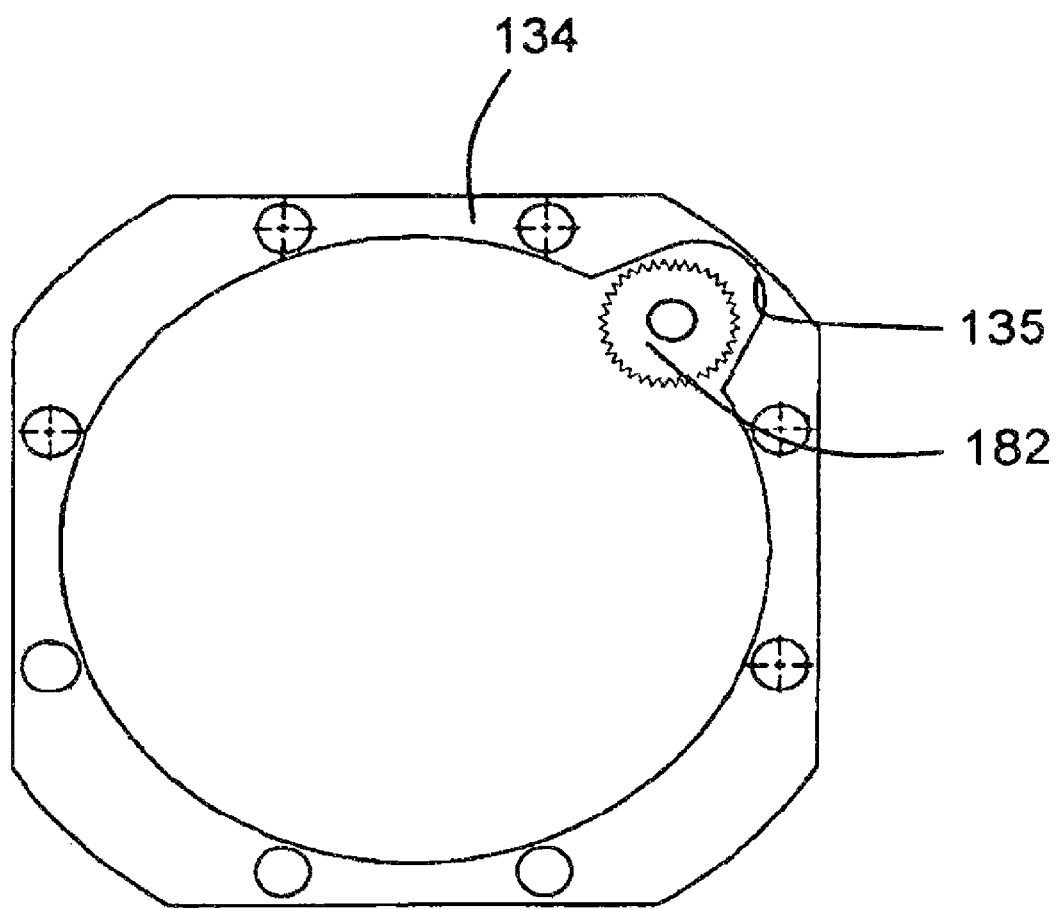
FIG. 21 shows the position of the drive gear relative to the top center plate of the swivel mechanism of FIG. 9.

When employed to swivel an implement, such as bucket 2, relative to a boom on an excavator or in similar situations, the shaft 110 will rotate relative to the mounting member in the form of the top annular plate 130, as well as relative to the plates 132, 134 and 136. The implement can be attached to the implement attachment 119 in the form of a threaded connection at the lower end 118 of shaft 110. Boom attachment 138 on the top annular plate or mounting member 130 is used to attach the swivel mount 102 to the main arm 4 of a boom 3 on the excavator or similar equipment. Since the shaft 110 is not connected directly to the boom 3, rotation of the shaft 110 will impart rotation to the attached implement, such as bucket 2, about the shaft axis 112. Rotation is imparted to the shaft 110 by a hydraulic drive motor 180, which includes a drive gear 182. Drive gear 182, shown in FIG. 21 engages the driven gear 122 which extends around the circumference of the disk 120 as shown in FIG. 11. The hydraulic drive motor 180 is mounted on the top of the mounting member or top annular plate 130. The drive gear 182 is mounted on a shaft extending from the hydraulic drive motor 180 through an opening 131 on top plate 130, which is aligned with an inwardly facing recess 135 on the top rim plate 134. The inwardly facing recess 135 provides space for the drive gear 182 which will engage the driven gear 122 on disk 120. Rotation of the drive gear 122 will thus cause the shaft 110 to rotate in either direction and through as many partial or complete revolutions as needed to manipulate the implement, such as bucket 2.

The hydraulic drive motor 180 is connected to the hydraulic lines mounted on a boom for a piece of equipment, such as an excavator. The hydraulic motor 180 does not rotate relative to the main arm 4 of the boom as the swivel mount 102 rotates the bucket 2, and therefore the hydraulic lines will not become entangled. The standard boom hydraulic lines, not shown, are also attached to a hydraulic union 184 mounted on the top end 116 the shaft 110. The passages 111 communicate with the hydraulic union 184 to permit hydraulic fluid to be transmitted through the shaft 110, and therefore to the swivel mount apparatus 102, so that hydraulic fluid can be supplied to a mechanism or implement mounted to the bottom of the shaft 110. The hydraulic union comprises a conventional component that will allow rotation between two connected sets of hydraulic lines without entangling the lines. The bottom part of hydraulic union 184, affixed to the shaft 110 will rotate with the shaft. The top part of the conventional hydraulic union attached to the hydraulic lines on the boom 3, need not rotate with the shaft 110. In this way an implement, such as a bucket 2 can rotate through a complete revolution or through multiple complete revolutions without entangling hydraulic lines and can also provide hydraulic power mounted to the lower end of the swivel mount apparatus 102.

In addition to rotating an implement, such as a bucket 2, it may also be desirable to tilt the bucket about an axis that is perpendicular to the shaft axis 112 and the transverse axis 114 about which the wrist joint 10 can rotate the implement. A hydraulic tilt mechanism 170 will allow the implement to be tilted as well as swiveled by the swivel mount apparatus 102. The tilt mechanism comprises two brackets 172 and 174 that can be rotated relative to each other about a pin 176 joining the two brackets at an upper end. Two pistons, not shown, would extend between the brackets 172 and 174 on opposite sides of the pin 170. These pistons would extend at an angle, similar to the pistons 88 shown in FIG. 7, and these pistons would connect diagonally opposite ends of the brackets 172 and 174. Extension of one of these pistons will cause the brackets 172 and 174 to mutually tilt in one direction. Extension of the other piston will cause the brackets 172 and 174 to mutually tilt in an opposite direction. One bracket 172 is attached to the swivel mount apparatus 102 and the other bracket 174 is attached to an implement, such as a bucket 2. Thus the bucket 2 can be tilted relative to the swivel mount apparatus 2, and the swivel mount apparatus 2 can still swivel the bucket 2 about an axis transverse to the tilt axis. The tilt mechanism 170 is hydraulically driven by the same source of hydraulic pressure as the swivel mount apparatus 102, and the pistons comprising parts of the tilt mechanism 170 are connected to this source of hydraulic pressure without entanglement of the hydraulic lines by rotation of the swivel mount apparatus 102. The implement, such as the bucket 2, can thus be positioned in almost any orientation by combined manipulation of the wrist joint 10, the swivel mount apparatus 102 and the tile mechanism 170 using the source of hydraulic pressure employed with an excavator or with a similar source of hydraulic pressure.

Figure 22:
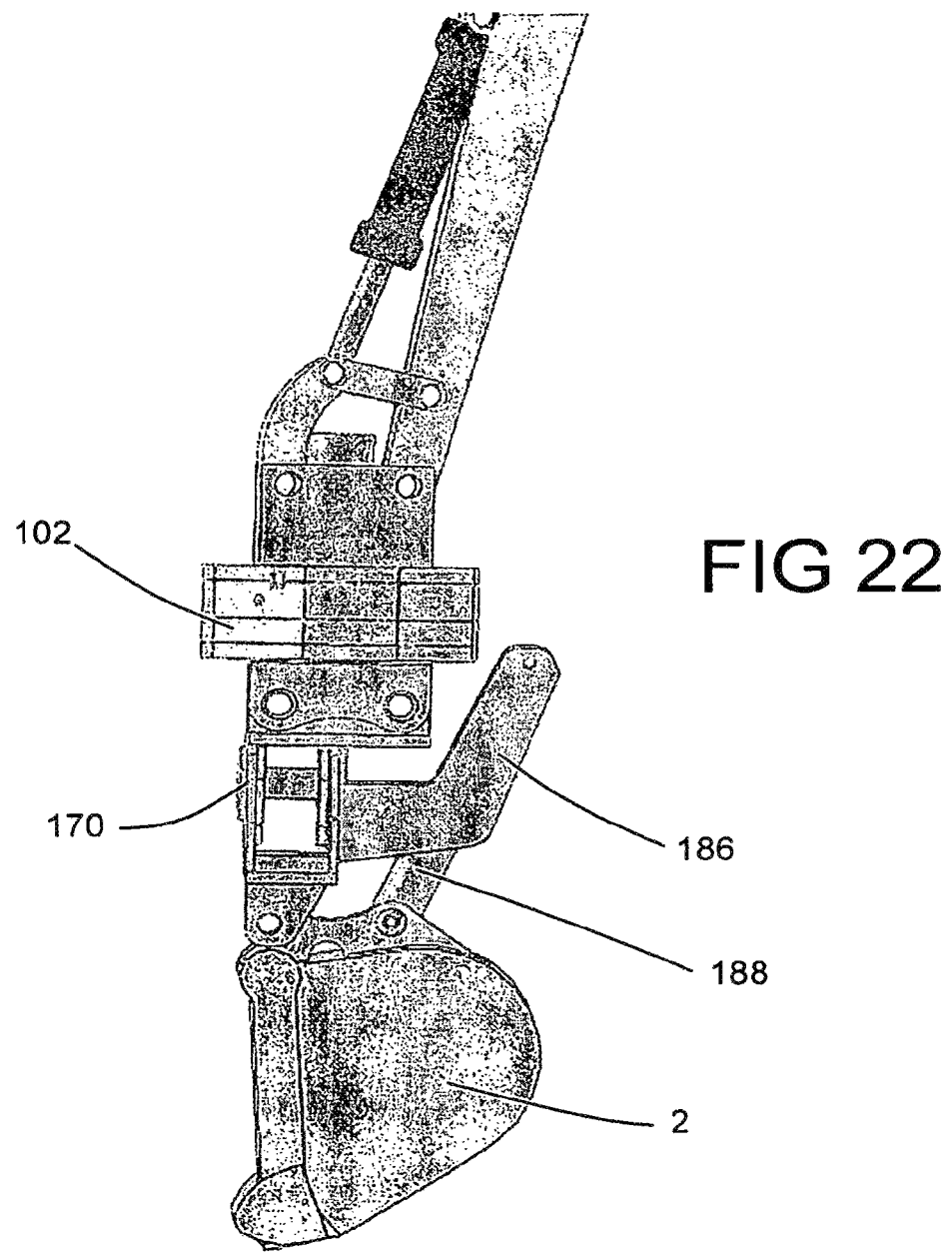
FIG. 22 is a view of a snap mechanism that can be used in conjunction with the swivel and tilt mechanisms of FIG. 9.

Other hydraulically mechanisms can also be employed in this system. For example, a snap mechanism can be mounted on a bucket 2. As shown in FIG. 22 a snap arm 186 can be attached to a bucket 2, and a snap piston 188 can extend between the snap arm 186 and a bucket mount. Hydraulic pressure can be applied to snap piston 188 to snap or jar the bucket 2 to dislodge debris, such as wet dirt that may stick to the sides of the bucket 2. The hydraulic lines extending through the shaft 110 and the swivel mount 102 would supply the pressure to activate piston 188.

Bearings are included in the swivel mount apparatus 102 to ensure that the shaft 110 and disk 120 can rotate relative to the top annular plate or mounting member 130, as well as with respect to the bottom annular plate 132 in the presence of relatively large loads that could be exerted on the swivel mount apparatus 102, either through the boom 3 or through the implement, such as bucket 2, attached to the opposite side of the swivel mount apparatus 102. Gear bearings 150 are employed to bear these loads that would be expected in the use of earth moving equipment or in similar activities where large loads or forces will be encountered. Gear bearings of this type are also shown in US Published Patent Application 2009/0097794, previously incorporated herein by reference. Gear bearings 150 are located between the rotating disk 120 and the top annular plate 130. Gear bearings 150 are also located between the disk 120 and the bottom annular plate 132, so that the disk 120 will be supported on both sides by gear bearings 150. Each gear bearing 150 comprises conical surfaces 152 on opposite ends of each gear bearing with peripheral bearing gears 154 extending between conical bearing surfaces 152. The conical surfaces 152 will comprises the primary load bearing surfaces, and the bearing gears 154 will act to ensure that the gear bearings 150 will rotate under all anticipated operating conditions so that the bearings will not be damaged or will at least have a relatively long service life.

A number of gear bearings 150 are positioned in a circular array surrounding the shaft 110. The gear bearings 150 are evenly spaced and are positioned in circular raceways extending around the shaft 110. Gear bearings 150 are positioned above and below the disk 120. The gear bearings 150 on the upper side of disk 120 are positioned in inner first tapered raceway 141 and outer first tapered raceway 142 on the disk so that the conical bearing surfaces 152 engage the tapered surfaces on the upwardly facing first circular raceways 141 and 142. The same gear bearings 150 are also located between inner second tapered raceway 143 and outer second tapered raceway 144 along the interior side of the top annular plate 130. The conical bearing surfaces 152 engage the tapered surfaces on the first and second raceways 141-144 to bear the majority of the loads applied between the disk 120 and the top annular plate 130. Gear bearings 150 located below the disk 120 reside in third inner and outer tapered raceways 145 and 146 on the lower surface of the disk 120 and also in the fourth inner and outer tapered raceways 147 and 148 on the bottom or third annular plate 132. Although the gear bearings located above and below the disk 120 reside in the respective raceways in a similar manner, the angular position of the gear bearings 150 above disk 120 can be staggered relative to the angular position of the gear bearings 150 between the disk 120 and the third annular plate 132.

Figure 23:
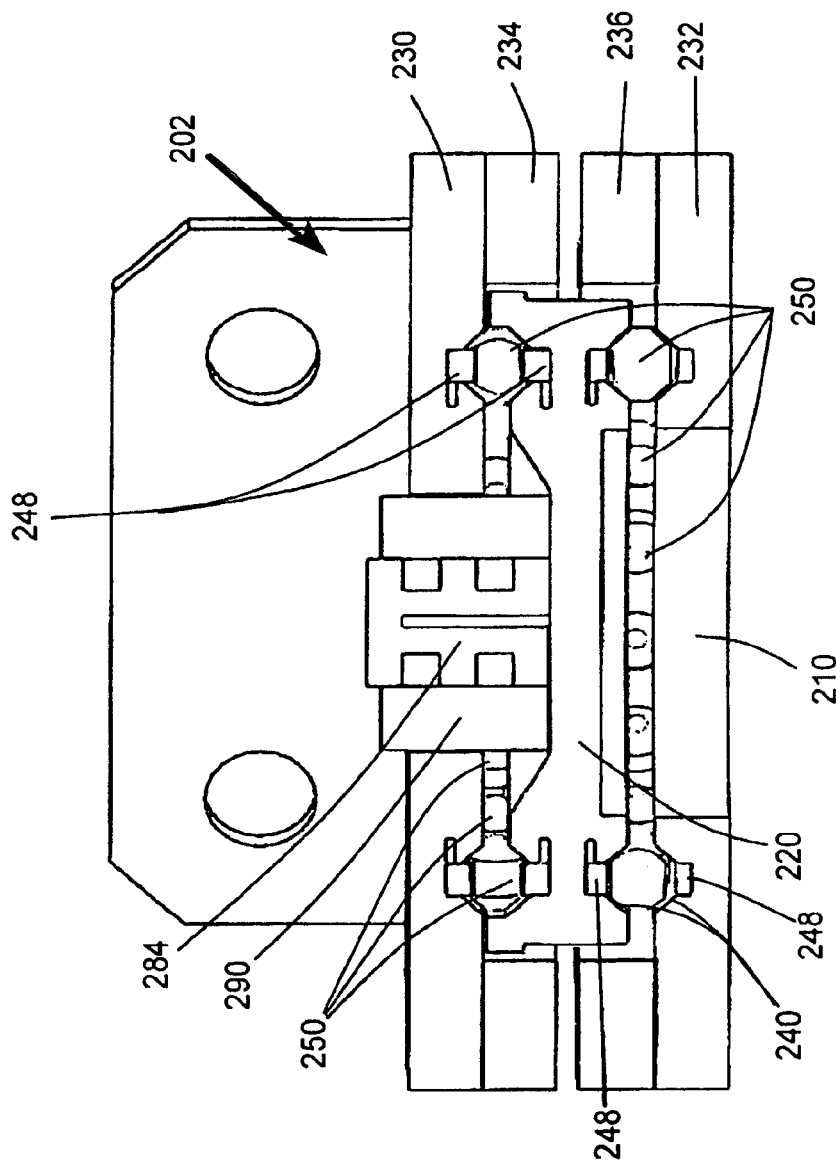
FIG. 23 is an elevational view of a third embodiment employing a one-piece annular rotatable member in conjunction with a hydraulic union mounted in the center of the annular rotatable member.
Figure 24:
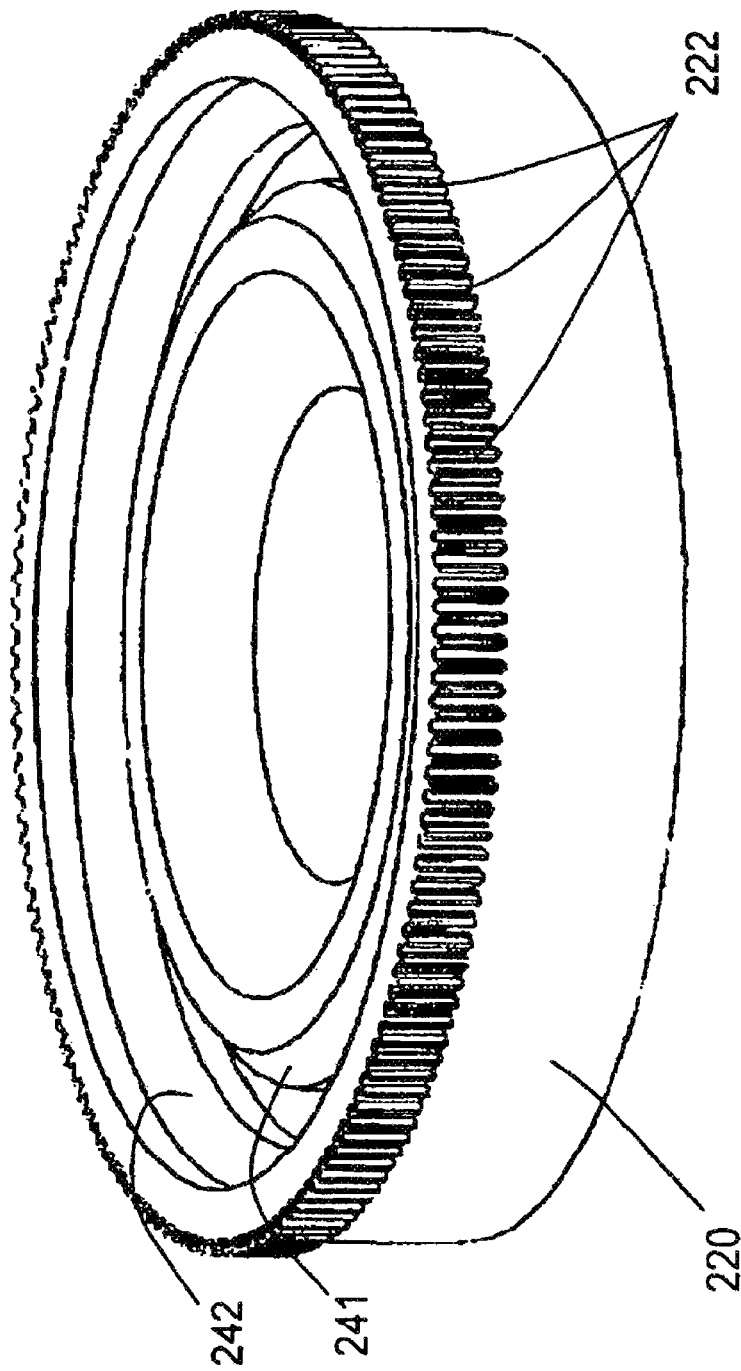
FIG. 24 is a three dimensional view of the one-piece rotatable member of FIG. 23.

In another alternate embodiment, the shaft is replaced by a hydraulic union that is attached through a spacer to the implement of an intermediate mechanism such as the tilt mechanism. The spacer is also attached to a one-piece disk that engages the gear bearings on the interior face between the top and bottom plates. This hydraulic union is spaced from the central openings of the top and bottom plates and the supplemental gear bearings of the embodiment of FIG. 9 are no longer needed. The main gear bearings provide adequate vertical and horizontal support. The swivel mechanism 202 of FIG. 23 is an example in which a single piece rotor or disk 220 is supported by a series of gear bearings 250 located in circular rows above and below the rotor 220. Gear bearings 250 engage bearing raceways 240, as well as raceway gears 248. Top and bottom plates 230 and 232 include raceways that engage opposite sides of the gear bearings 250. Upper and lower center plates 234 and 236 are located between the top and bottom plates 230 and 232, and the center plates 234 and 236 extend around the periphery of the rotor 220. A hydraulic union 234 is mounted on or affixed to the rotor 220 and permits hydraulic lines to extend through the swivel mechanism 202 so that hydraulic pressure can be delivered to implements attached at the lower end of the swivel mechanism 220. An anti-friction bushing 290 can be positioned between the hydraulic union 284 and the edges of the central opening in top plate 230. A spacer 210, attached to the rotor 220 can include mounting means for attaching implements or other actuators, such as a tilt mechanism similar to that employed with the second embodiment.

FIGS. 25-27 show an alternate embodiment of a gear bearing 350 that can be employed in the swivel adapter shown in FIG. 9 to replace the gear bearings 150. This gear bearing 350 differs from the gear bearing 150 because the thickness of each of the gear teeth 354 increases from one narrower end 355 of each individual gear tooth 354 to the opposite wider end 356 of the gear bearing 350. Opposite surfaces defining each gear tooth 354 diverge from the narrower end 355 and the wider end 356. The thickness of the mating gear teeth in the raceways on the opposite sides of the gear bearing 350 will also include gear teeth that would mate with these gear teeth 354. The bearing surfaces 352 on the gear bearings 350 will also be dimensioned to bear against raceway bearing surfaces. These bearing surfaces 352 can be conical or they can be crowned or have any other configuration suitable for engaging opposing bearing surfaces.

The gear bearings 350 are oriented so that the wider ends 356 of the gear teeth 354 would be located closer to the periphery of the rotating disk 120 with the narrower ends 355 of the gear teeth 354. The radius of the rotating disk 120 will be greater at the wider, outer gear teeth ends 356 than at the narrower, inner gear teeth ends 355. The increasing radius results in some slippage when gear teeth 154 of constant thickness are employed. The increase in thickness from the inner gear teeth ends 355 to the outer gear teeth ends 356 eliminates slippage and permits smoother operation of the swivel mechanism. The outer diameter of the gear bearings 350 can also be larger than the inner diameter and the bearing surfaces on the inside and outside need not be identical, so long as the gears and the bearing surfaces on the gear bearings will mate with the opposing raceways.

Figure 28:
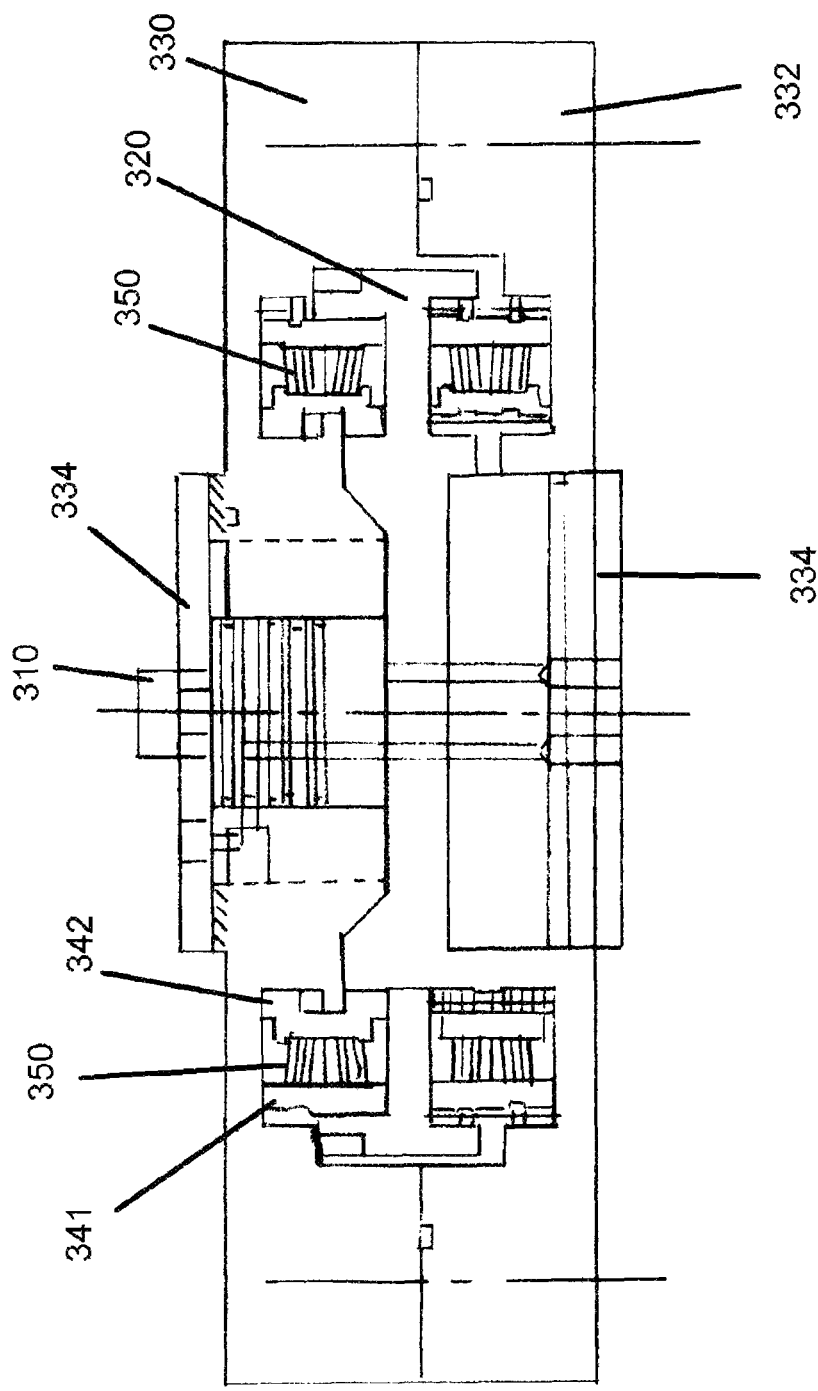
FIG. 28 is a schematic, viewed from the side showing how the bearings of FIGS. 25-27 would be employed.

FIG. 28 is a schematic viewed from the side showing the assembly in which the gear bearings 350 would be employed. In this assembly a plurality of gear bearings 350 and associated raceways 341 and 342 are located above and below a flywheel 320. Gear bearings 350 and associated raceways 341 and 342 are located between the upper housing 330 and the flywheel 320. Gear bearings 350 and associated raceways 341 and 342 are also located between the lower housing 332 and the flywheel 320. As with the other embodiments depicted herein, a plurality of gear bearings 350 are deployed around the output shaft 310, which is connected to a rotary union 334. Each of the gear bearings 350 are positioned between an exterior raceway 341 and an interior raceway 342, with the interior raceways associated with the upper housing 330 and the lower housing 332 being adjacent the horizontal centerline of the assembly as shown in FIG. 28.

Figure 29:
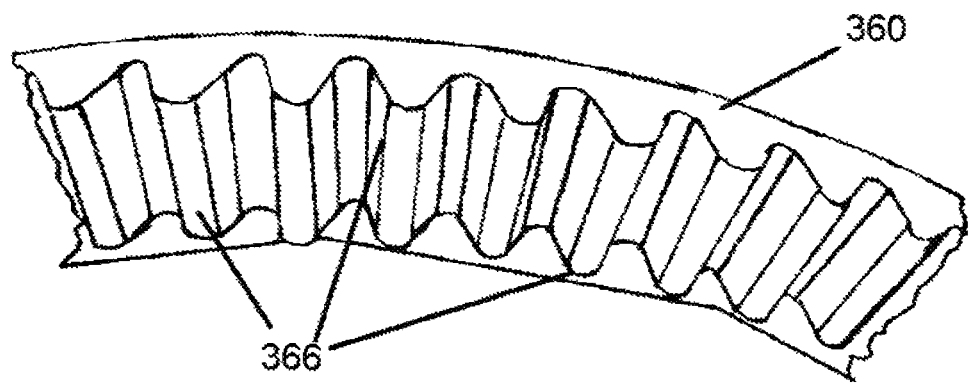
FIG. 29 is a fragmentary view showing the gears employed in the raceways of the assembly of FIG. 28 as seen from the outside.
Figure 30:
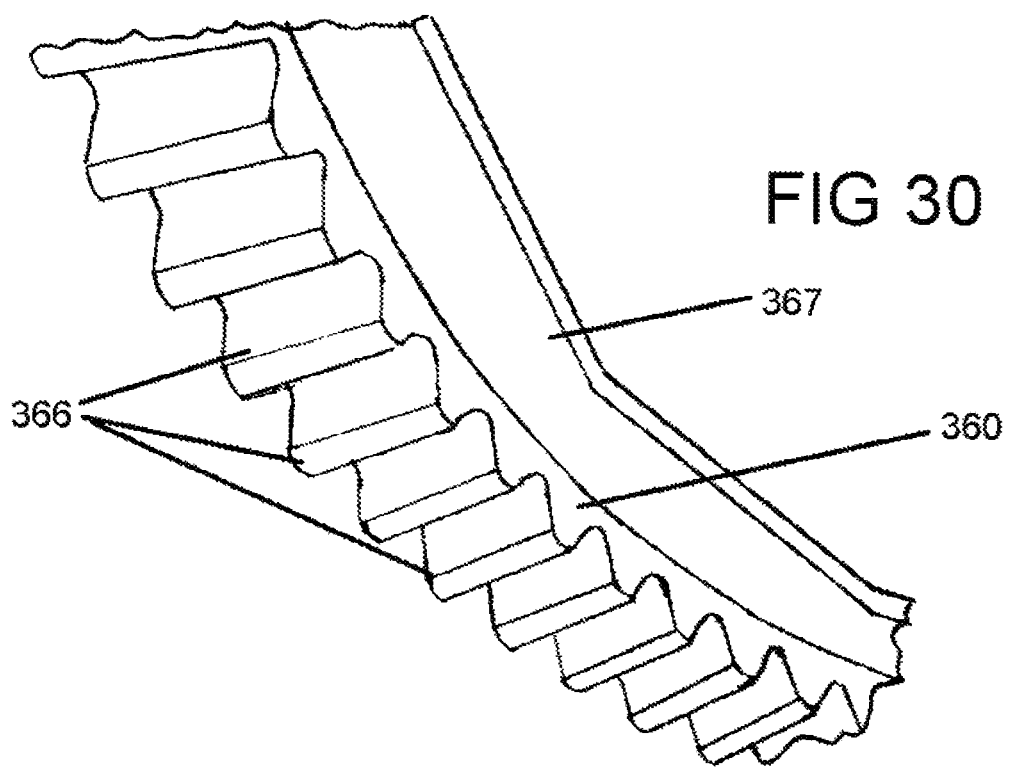
FIG. 30 is a fragmentary view showing the gears employed in the raceways of the the assembly of FIG. 28 as seen from the inside.

FIGS. 29 and 30 are fragmentary views of a face gear or raceway gear ring 360 that would be employed with the gear bearings 350. FIG. 29 shows a portion of a gear ring 360 which would be employed in the embodiment of FIG. 28. The observer would be viewing the gear ring 360 from the outside in FIG. 29. In FIG. 30, the observer is viewing the gear ring 360 from the inside where the flange 367 that will fit beneath the interior raceway ring containing a smooth load bearing surface 352 which will engage the load bearing surfaces of the divergent gear bearing 350 of FIGS. 25-27. The race or face gears 360, shown in FIGS. 29 and 30, extend radially, and the width of these race or face gears is greater at its exterior periphery than at its interior periphery. Thus the gear bearings 350 and the race gears 366 both diverge so that the gears will mate, and there will be no slippage.

Figure 31:
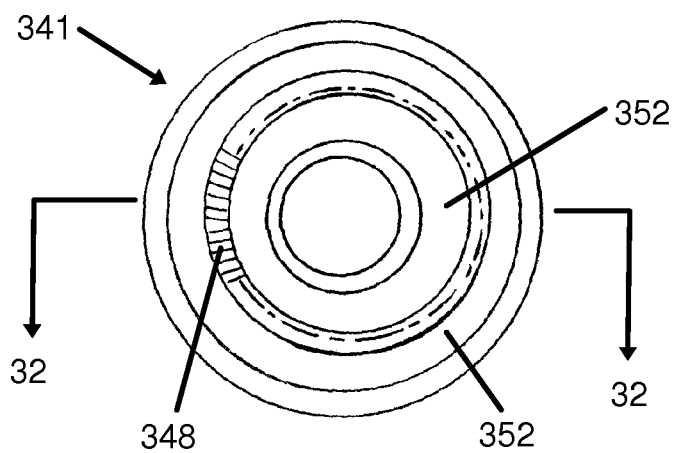
FIG. 31 is a plan view showing a lower raceway in which the bearings of FIGS. 25-27 are employed.
Figure 32:
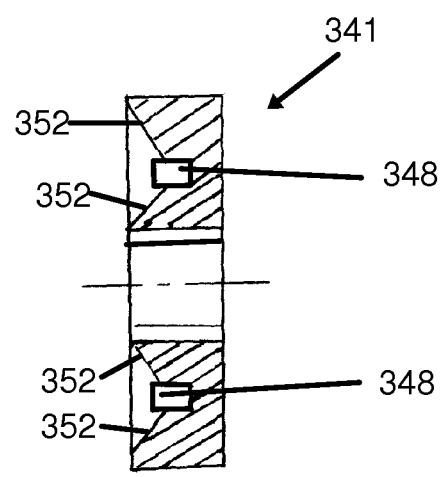
FIG. 32 is a section view taken along section lines 32-32 in FIG. 29.

The race or face gears shown in FIGS. 29 and 30 would be employed in an assembly in which the inner and outer raceway bearing members would comprise two different components that would be mounted on opposite sides of a ring gear. FIG. 31 shows another embodiment in which the raceway bearing member could comprise a one-piece member with inner and outer smooth load bearing surfaces on opposite sides of a ring gear that is inserted into a circular channel, as also shown in the section view of FIG. 32. Since the raceway bearing member would comprise a one piece member, the dimensional tolerances arising from the necessity of attaching two separate members would be eliminated. The gear bearings 350 would ride between the oppositely inclined raceway load bearing surfaces, which are seen in FIG. 32 and the gear bearing load bearing surfaces 352 would engage the raceway load bearing surfaces. The divergent gears 354 on the gear bearings 350 would engage the divergent gears 366 on the raceway gear ring 360 to prevent slippage along the mating load bearing surfaces and to maintain the gear bearings 350 in proper position with proper spacing between adjacent gear bearings.

Figure 33:
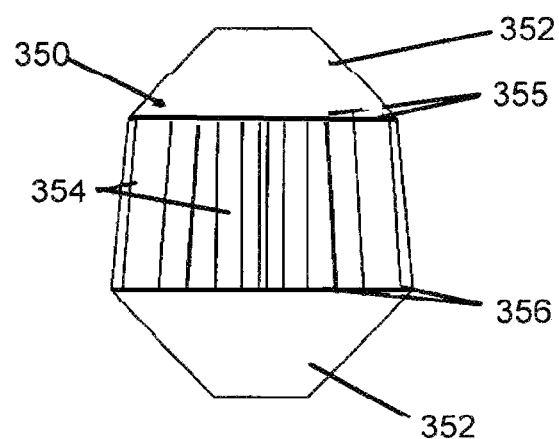
FIG. 33 is a view of a modification of a gear bearing with divergent gears in which the load bearing surfaces of the individual gear bearings forms a continuous conical surface to provide a larger bearing surface engaging the associated raceway load bearing surface.

Another modification of the divergent gear bearings 350 is shown in FIG. 33. In this embodiment, the load bearing surface 352 on the gear bearings 350 would comprise a smooth continuous conical surface that would not be interrupted by grooves extending between the gear teeth 354 and into the portion of the gear bearing load bearing surface that would engage the raceway load bearing surface. With this embodiment, the gear bearing load bearing surface 352 would be in continuous contact with the raceway load bearing surface as the gear bearing 350 rotates about its axis and revolves around the shaft axis. The gear teeth 354 would be recessed into the body of the gear bearing in FIG. 33, but these divergent gear teeth 354 could be formed by electrical discharge machining (EDM). The gear bearing load bearing surface 352 can comprise a hardened bearing material in the form of a sleeve that can be bonded to a divergent gear bearing 350, after ends of the bearing have been milled or machined to provide space for the conical bearing sleeve. Alternatively the divergent gear bearing 350 shown in FIG. 33 can be fabricated from a single piece of metal having the desired hardness and other properties suited for carrying the intended loads.

FIG. 34 is a three dimensional view of six gear bearings 450 as they would be position between oppositely facing raceway ring gears 440 and 442. The raceway load bearing surfaces are not shown so that the gear bearings and the raceways can be more readily seen. Although the gears in FIG. 34 are straight gears, it should be understood that the position of the raceway ring gears above and below the gear bearings would remain the same when divergent gears are employed on both the gear bearings and the raceway gears.

The embodiments depicted herein are merely representative of the swivel mount and bearing assemblies comprising the invention defined by the claims presented herein. One of ordinary skill in the art would appreciate that modifications to the divergent gear bearings and bearing assemblies as claimed herein can be made without departing from the scope of this invention as defined by the following claims.

I claim:

1. A swivel adapter mount for swiveling an earth moving implement relative to a boom, the earth moving implement also being tiltable relative to the boom about a tilt axis transverse to a swivel axis, the swivel adapter comprising;
   a mounting member attachable to the boom;
   a rotatable member attachable to the earth moving implement and rotatable about the swivel axis extending through a central section of the rotatable member, the rotatable member being driven to rotate relative to the mounting member to swivel the earth moving implement transverse to the tilt axis and relative to the boom when the swivel adapter mount is attached thereto; and
   a plurality of gear bearings located between the mounting member and the rotatable member and extending around the rotatable member and spaced from the swivel axis, each gear bearing engaging raceways on the mounting member and the rotatable member,
   wherein each gear bearing comprises gears extending around the gear bearings and at least one bearing surface, individual gear teeth on the gears having a thickness at one end that is greater than the thickness at an opposite end.

2. The swivel adapter mount of claim 1 wherein the raceways engaged by the gear bearings have raceway gears having raceway gear teeth with a thickness at an outer end greater than at an inner end to mesh with the gear teeth on the gear bearings.

3. The swivel adapter mount of claim 2 wherein the raceway gears extend radially.

4. The swivel adapter mount of claim 1 wherein the raceways have outer raceway bearing surfaces inclined at a greater angle than inner raceway bearing surfaces.

5. The swivel adapter mount of claim 1 wherein the gear bearings comprise one piece members.

* * * * *